(12) United States Patent
Garibaldi et al.

(10) Patent No.: US 12,230,824 B2
(45) Date of Patent: Feb. 18, 2025

(54) POWER TOOL SYSTEM

(71) Applicant: BLACK & DECKER, INC., New Britain, CT (US)

(72) Inventors: Nicholas J. Garibaldi, Bel Air, MD (US); Luke R. Barton, Pontiac, MI (US); Abhisheka Moturu, Pikesville, MD (US); Timothy Hennesy, Baltimore, MD (US); Michael W. Roberts, Red Lion, PA (US); Jason Dunthorn, Baltimore, MD (US); John Palermo, Baltimore, MD (US); Steven Derby, Towson, MD (US); Mahmudul Bhuiyan, Towson, MD (US)

(73) Assignee: BLACK & DECKER INC., New Britain, CT (US)

( * ) Notice: Subject to any disclaimer, the term of this patent is extended or adjusted under 35 U.S.C. 154(b) by 651 days.

(21) Appl. No.: 17/424,160

(22) PCT Filed: Aug. 14, 2019

(86) PCT No.: PCT/IB2019/000960
§ 371 (c)(1),
(2) Date: Jul. 19, 2021

(87) PCT Pub. No.: WO2021/181125
PCT Pub. Date: Sep. 16, 2021

(65) Prior Publication Data
US 2022/0328924 A1 Oct. 13, 2022

Related U.S. Application Data

(60) Provisional application No. 62/718,884, filed on Aug. 14, 2018.

(51) Int. Cl.
*H01M 50/247* (2021.01)
*B25F 5/02* (2006.01)
*H01M 50/213* (2021.01)

(52) U.S. Cl.
CPC ............ *H01M 50/247* (2021.01); *B25F 5/02* (2013.01); *H01M 50/213* (2021.01); *H01M 2220/30* (2013.01)

(58) Field of Classification Search
CPC ... B25F 5/02; H01M 2220/30; H01M 50/207; H01M 50/213; H01M 50/247;
(Continued)

(56) References Cited

U.S. PATENT DOCUMENTS 8,389,141 B2 3/2013 Suzuki et al.
8,852,794 B2 10/2014 Laitinen et al.
(Continued)

FOREIGN PATENT DOCUMENTS

| JP | 2018106796 A | 7/2018 |
| WO | 2016/155559 | 10/2016 |
| WO | 2017110036 A1 | 6/2017 |

OTHER PUBLICATIONS

International Search Report and Written Opinion issued in corresponding International Patent Application No. PCT/IB2019/000960, dated Dec. 7, 2021.
(Continued)

*Primary Examiner* — Victoria H Lynch
(74) *Attorney, Agent, or Firm* — Michael Aronoff

(57) ABSTRACT

A power tool system that includes a power tool having a receptacle for receiving a battery pack, the receptacle including a mechanical interface for mating with a battery pack, a first battery pack having a battery pack housing, the first battery pack housing including a mechanical interface for mating with the power tool, the first battery pack housing
(Continued)

having a first width dimension in a direction generally perpendicular to a direction in which the first battery pack mates with the power tool and a second battery pack having a battery pack housing, the second battery pack housing including a mechanical interface for mating with the power tool, the second battery pack housing having a second width dimension in a direction generally perpendicular to a direction in which the second battery pack mates with the power tool, wherein the second width dimension being at least about 1.5 times the first width dimension.

6 Claims, 34 Drawing Sheets

(58) Field of Classification Search
CPC ............. H01M 50/296; H01M 50/502; H01M 50/516; Y02E 60/10
See application file for complete search history.

(56) References Cited

U.S. PATENT DOCUMENTS

| | | |
|---|---|---|
| 9,190,644 B2 | 11/2015 | Smith et al. |
| 2014/0050945 A1 | 2/2014 | Kiger |
| 2014/0147718 A1 | 5/2014 | Furui et al. |
| 2017/0365826 A1 | 12/2017 | Varipatis et al. |

OTHER PUBLICATIONS

International Preliminary Report on Patentability issued in corresponding International Patent Application No. PCT/IB2019/000960, dated Dec. 30, 2021.

Non-Final Office Action issued in related U.S. Appl. No. 17/157,464, dated Feb. 23, 2023, pp. 1-11.

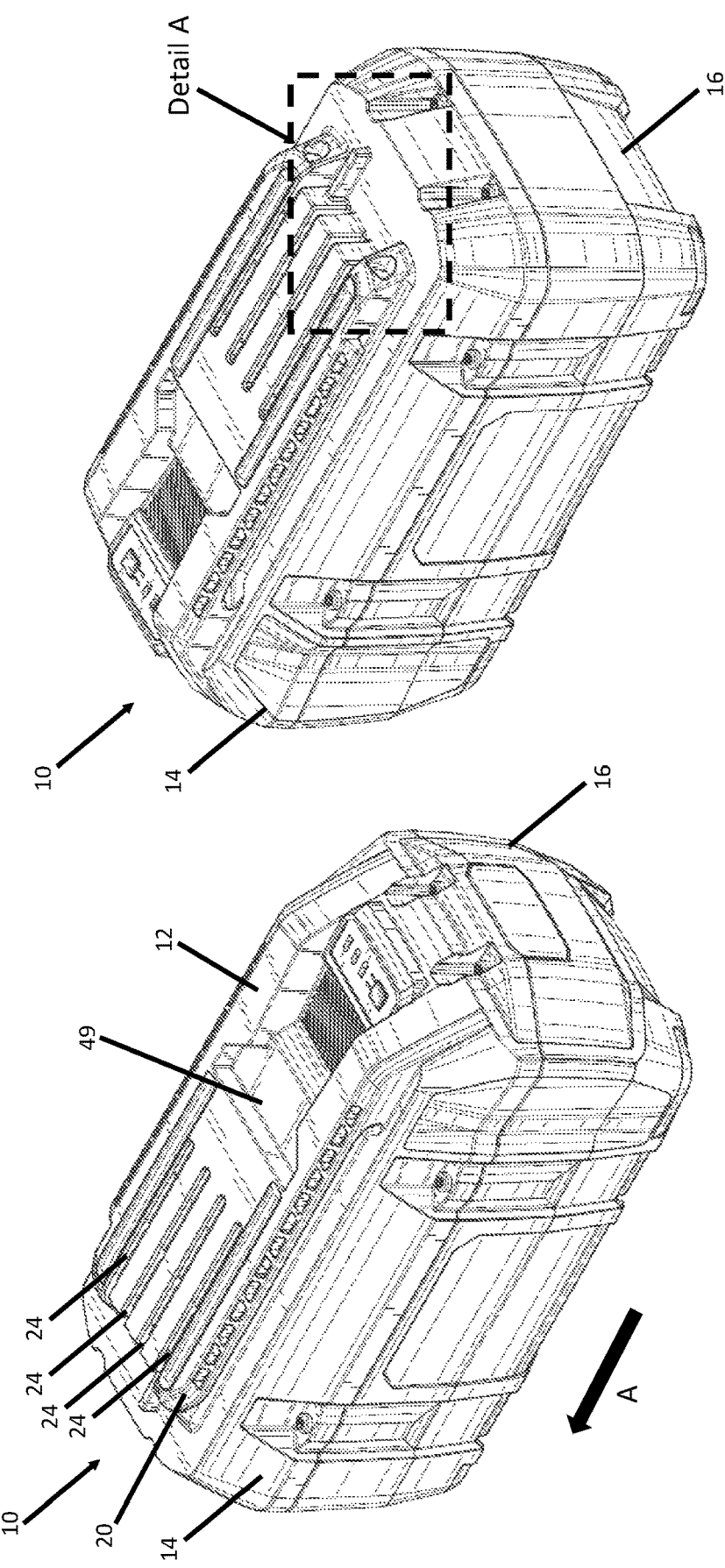

POWER TOOL SYSTEM

CROSS REFERENCE TO RELATED APPLICATION(S)

This application is the U.S. National Stage of PCT/IB2019/000960, filed Aug. 14, 2019, which in turn claims priority to U.S. Provisional Application No. 62/718,884, filed on Aug. 14, 2018, the disclosures of which are incorporated herein by reference in their entirety.

TECHNICAL FIELD

This application relates to a power tool system including a plurality of battery packs. In one implementation, the system includes at least one cordless power tool and at least two battery packs having the same rated voltage but with different capacities.

SUMMARY

An aspect of the present invention includes a battery cell holder with injection molded battery straps.

Another aspect of the present invention includes a battery terminal with a punched bead that contacts a power tool terminal.

Another aspect of the present invention includes a battery pack having a printed circuit board having drain holes within a footprint of a battery terminal for passing water and a cell holder beneath the printed circuit board that directs the water around the battery cells and out of the battery pack.

Another aspect of the present invention includes a battery pack having a plurality of modular cores wherein each modular core includes a plurality of battery cells.

Another aspect of the present invention includes power tool having a receptacle for receiving a battery pack wherein the receptacle includes a slot having a first dimension and a first battery pack having a battery pack housing having a first width dimension and a portion of a bottom wall of the first battery pack housing having a dimension parallel to the width dimension equal to the slot dimension that is received in the slot when the first battery pack is inserted into the battery pack receptacle and a second battery pack having a battery pack housing having a second width dimension that is greater than the first width dimension and a portion of a bottom wall of the second battery pack housing having a dimension parallel to the width dimension equal to the slot dimension that is received in the slot when the second battery pack is inserted into the battery pack receptacle.

These and other advantages and features will be apparent from the description and the drawings.

BRIEF DESCRIPTION OF THE DRAWINGS

FIG. 1 is a top, front, left side isometric view of an exemplary battery pack of the present invention.

FIG. 2 is a top, rear, right side isometric view of the battery pack of FIG. 1.

DETAILED DESCRIPTION

Figure 4:
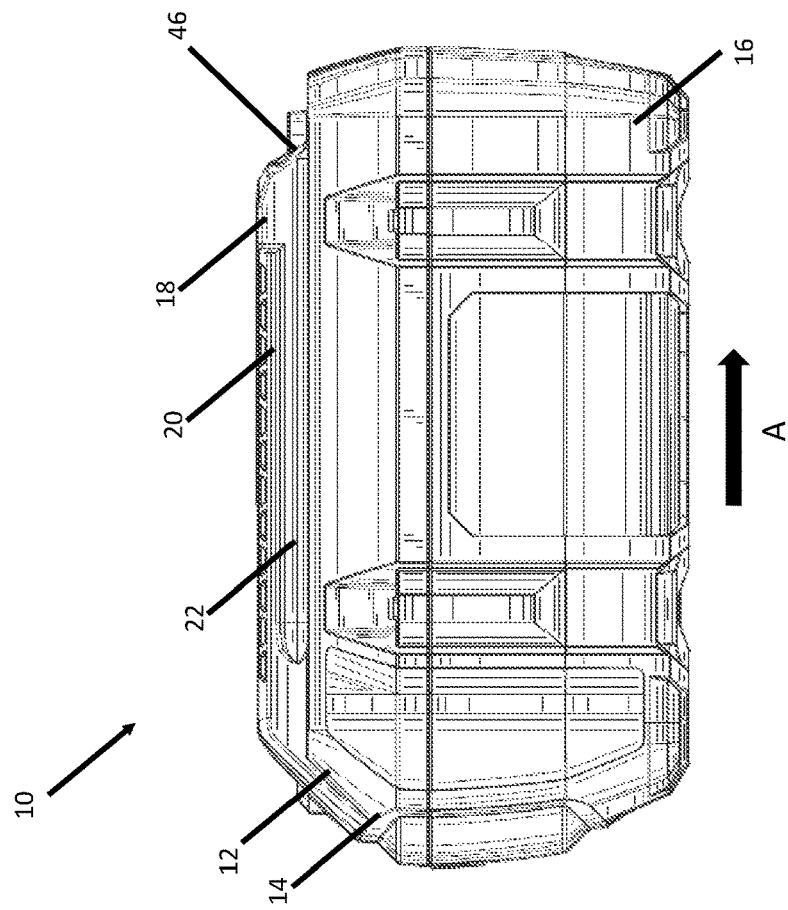
FIG. 4 is a right side, elevation view of the battery pack of FIG. 1.
Figure 3:
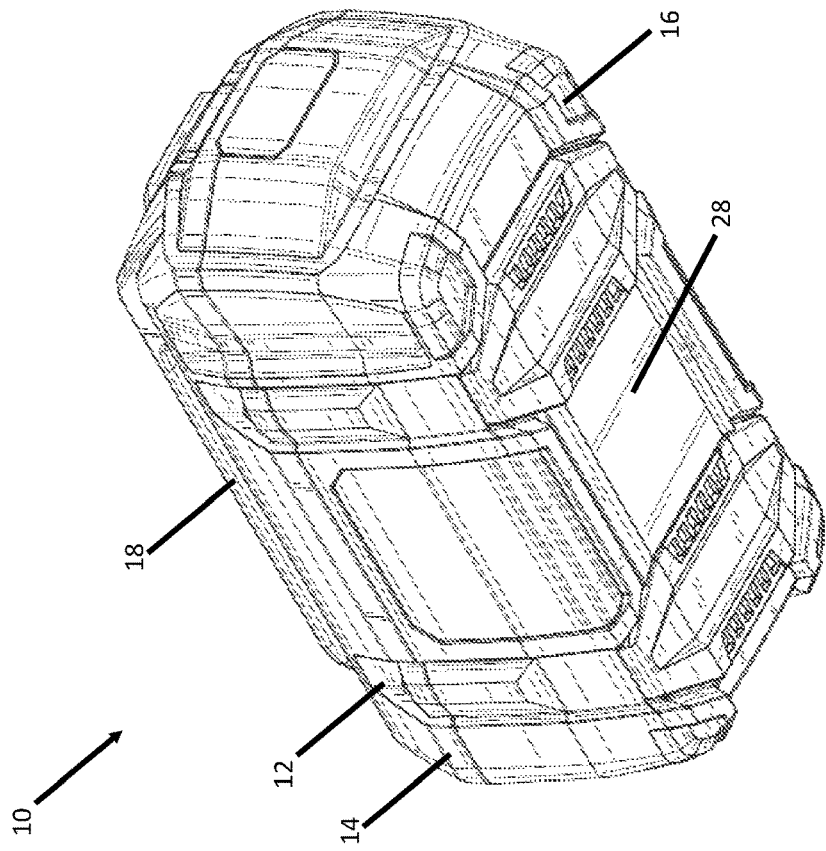
FIG. 3 is a bottom, front, right side isometric view of the battery pack of FIG. 1.
Figure 6:
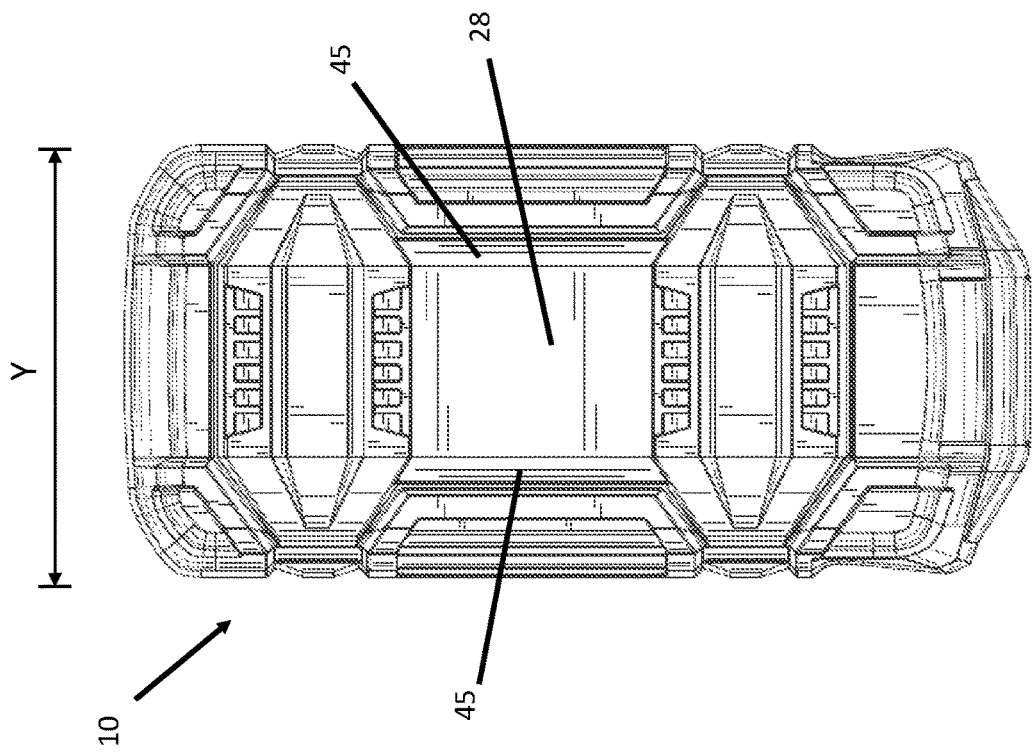
FIG. 6 is a bottom, plan view of the battery pack of FIG. 1.
Figure 5:
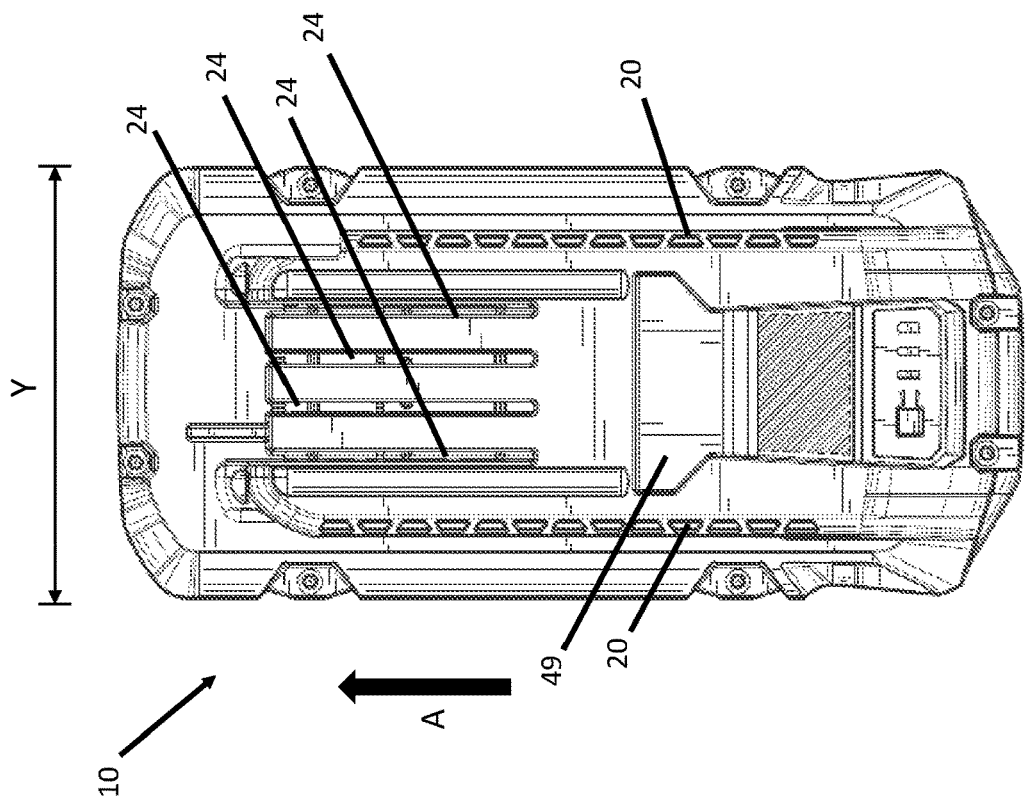
FIG. 5 is a top, plan view of the battery pack of FIG. 1.
Figure 8:
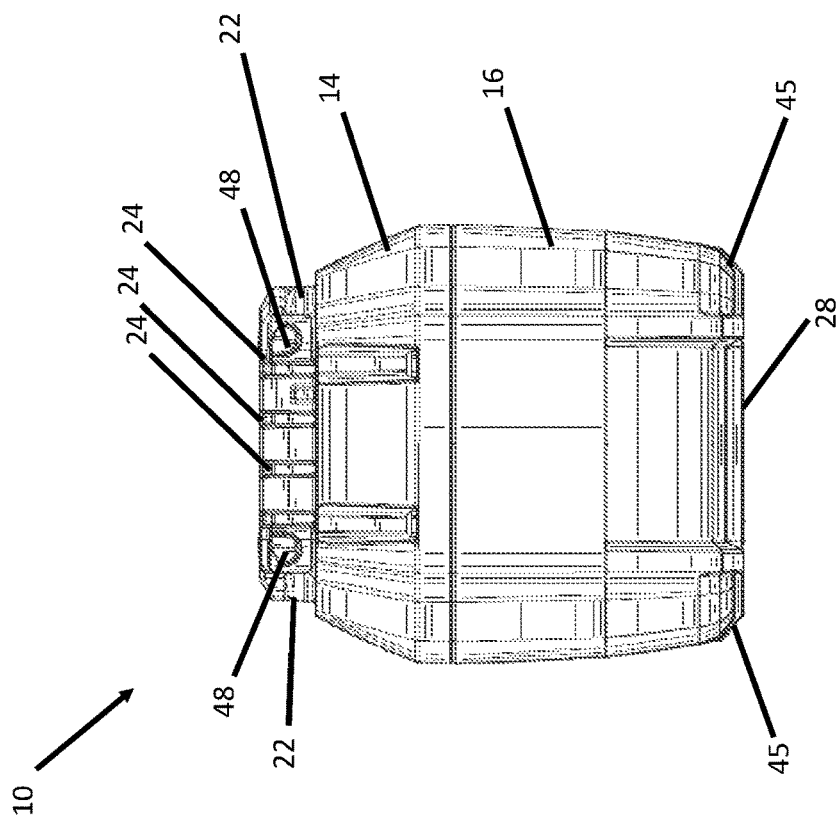
FIG. 8 is a rear, elevation view of the battery pack of FIG. 1.

Referring to FIGS. 1 through 8, in an exemplary embodiment, a first battery pack 10 includes a housing 12. The housing 12 includes an upper housing/portion 14 and a lower housing/portion 16. The upper housing 14 includes a mechanical interface 18 for mating and coupling with a power tool 200 having a corresponding mechanical interface 202. The battery pack mechanical interface 18 includes a pair of rails 20 and a pair of grooves 22. The grooves 22 receive a corresponding pair of rails 204 of the power tool 200. The battery pack mechanical interface 18 also includes a plurality of slots 24. The plurality of slots 24 are configured to receive a corresponding plurality (set) of power tool terminals 206 that mechanically and electrically mate with a corresponding plurality (set) of battery pack terminals 26, The plurality slots 24 define a plurality of parallel planes. The battery pack 10 is inserted into the power tool 200 in a direction parallel with the plurality of slots 24 and the plurality of parallel planes the insertion direction. The insertion direction is denoted by arrow A.

The first battery pack 10 has a width Y in a dimension perpendicular to the planes defined by the slots.

Figure 9:
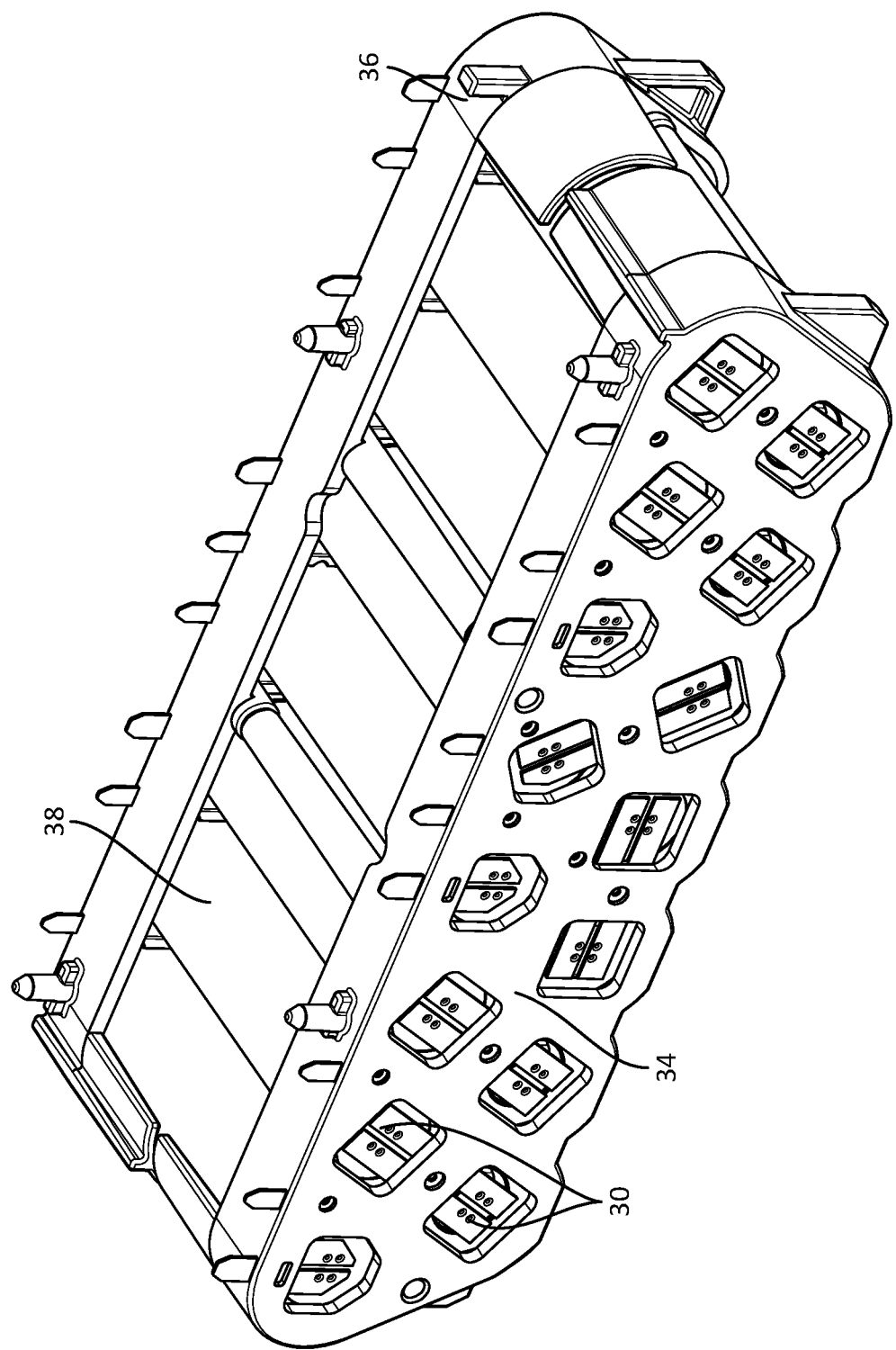
FIG. 9 is a view of an exemplary battery cell holder and a plurality of battery cells.
Figure 11:
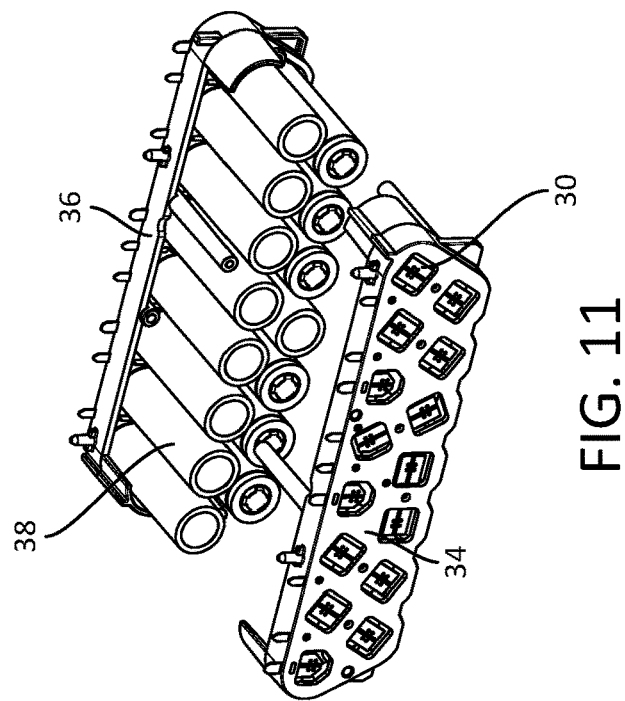
FIG. 11 is a view of the first subassembly and a second subassembly of the cell holder and the plurality of battery cells.
Figure 10:
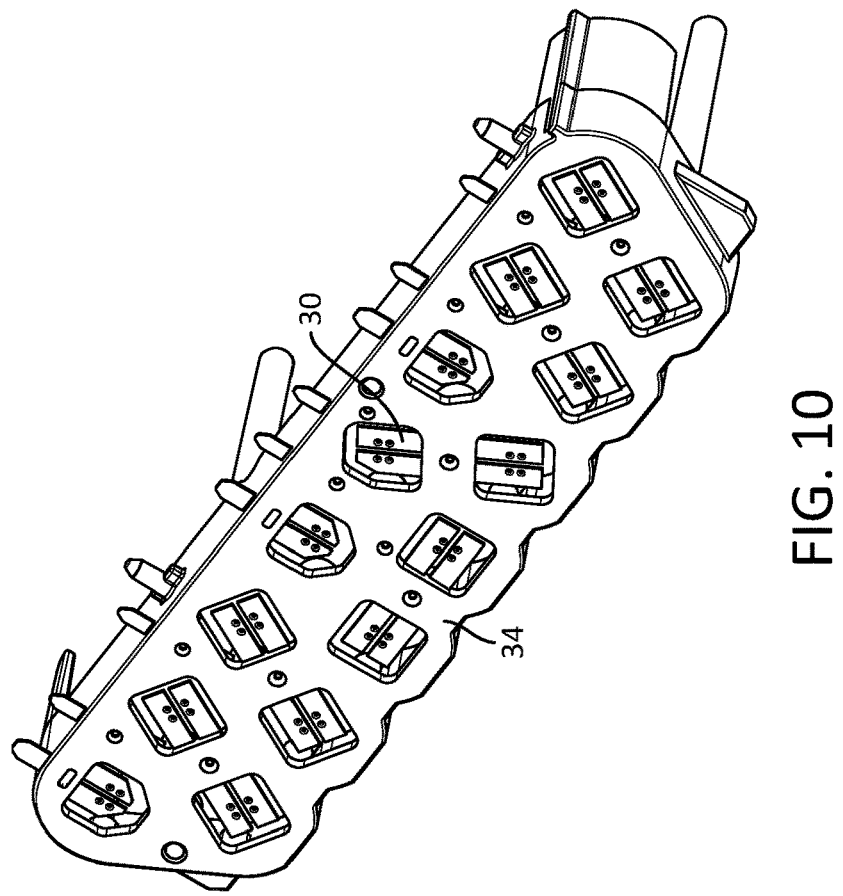
FIG. 10 is a view of a first subassembly of the cell holder of FIG. 9.
Figure 13:
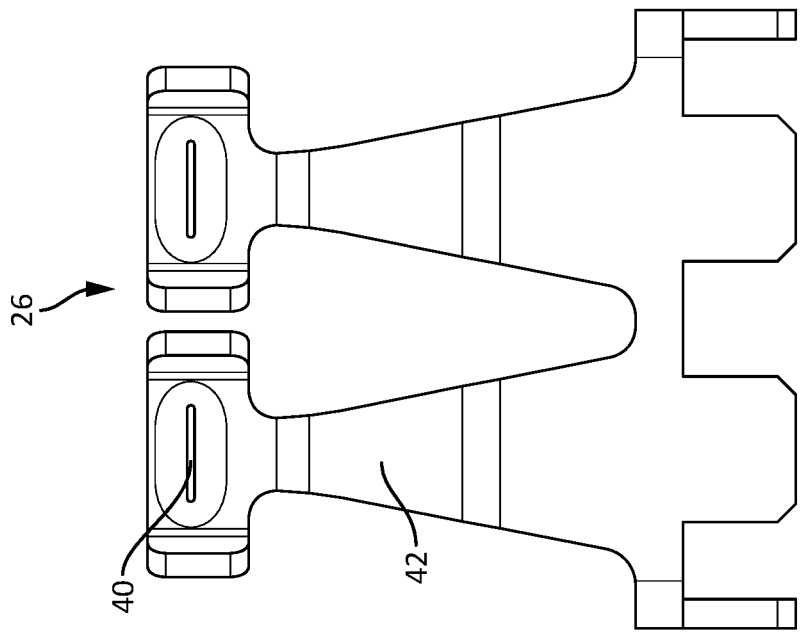
FIG. 13 is an elevation view of the battery terminal of FIG. 12.
Figure 12:
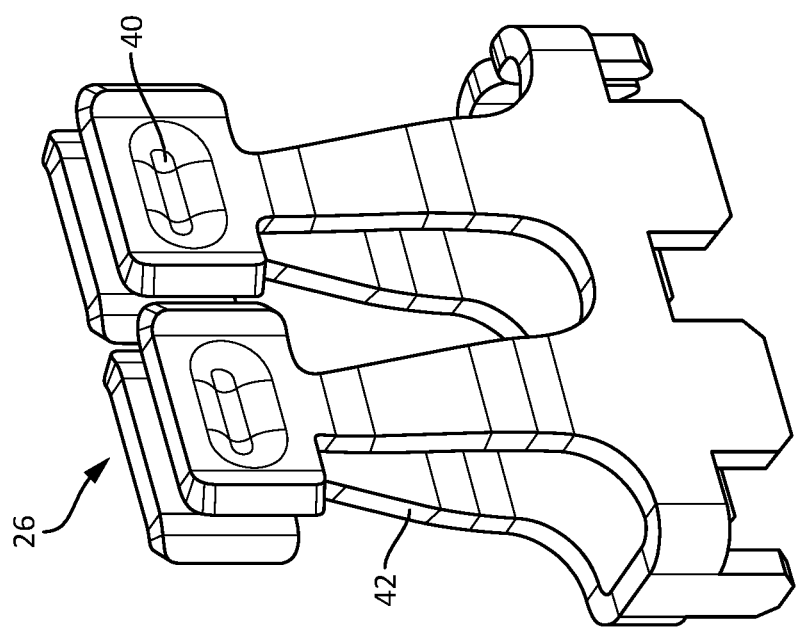
FIG. 12 is an isometric view of an exemplary battery terminal of the present invention.
Figure 14D:
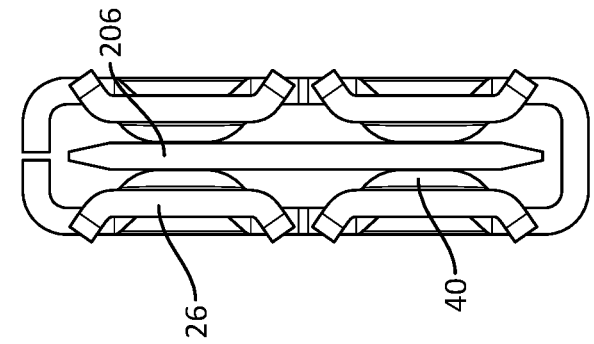
FIGS. 14A-14O are plan views of the battery terminal of FIG. 12 in various states of engagement with a power tool terminal.
Figure 14C:
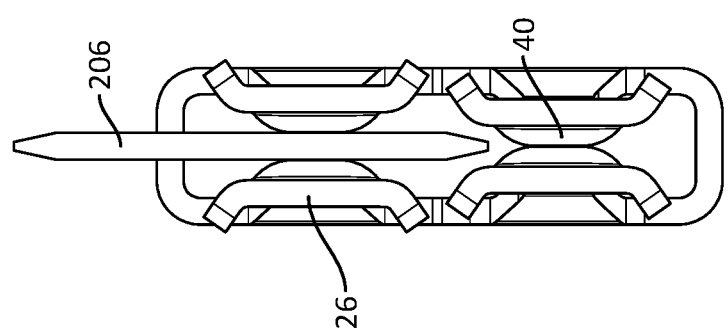
Figure 14B:
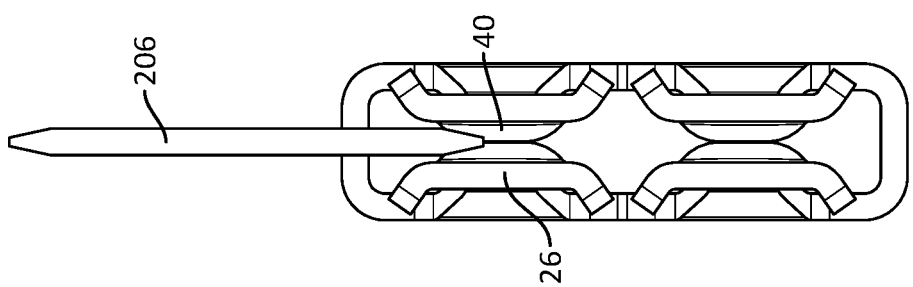
Figure 14A:
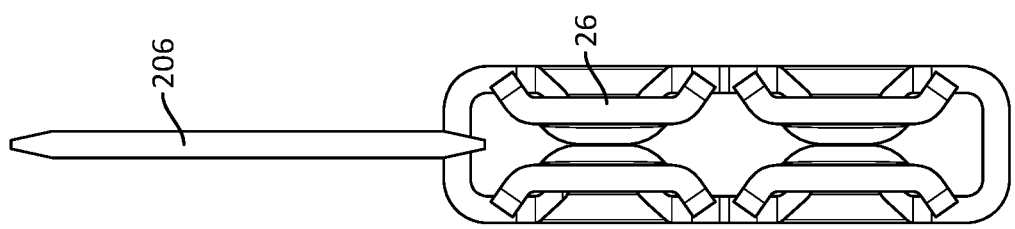

In order to connect a plurality of battery cells in a battery pack, a plurality of battery straps are applied to a cell holder. Applying these straps manually is a time consuming process and may lead to straps being applied to the wrong locations. This can be a safety concern. Referring to FIGS. 9 through 11, an exemplary embodiment is illustrated in which a plurality (set) of battery cell straps 30 are insert molded in a cell holder 32, This eliminates the risk of incorrect straps being place in incorrect locations, saves time in assembly and provides a product with fewer contaminants. As illustrated in FIG. 11, the cell holder 32 may include two subassemblies 34, 36 (A and B). To generate each subassembly 34, 36, the set of battery straps 30 are placed in a mold. Plastic (or other suitable material) is injection molded into the mold around the set of battery straps 30. The two cell holder subassemblies 34, 36 are then assembled with a plurality of battery cells 38 resulting in a cell holder/cell subassembly 32. The straps 30 may then be welded to the battery cells 38.

Referring to FIGS. 12, 13, 14A, 14B, 14C, and 14D, there is illustrated an exemplary battery terminal 26. As illustrated, contact points of the battery terminals 26 are beads 40 that are formed by a punch instead of a bend. The tool blade (terminal) 206 is perpendicular to spring arms 42 of the battery terminal 26. The springs arms 42 are completely independent to one another. The battery terminals 26 are mounted directly to a PCB 44 and then soldered. As such, no terminal block is needed. This configuration provides a large cross section that allows the battery terminal 26 to run cooler at higher current draw.

As illustrated in FIGS. 14A through 14D, the first part of the battery terminal 26 that makes contact with the tool terminal 206 is the bead 40 of the battery terminal 26.

Figure 15:
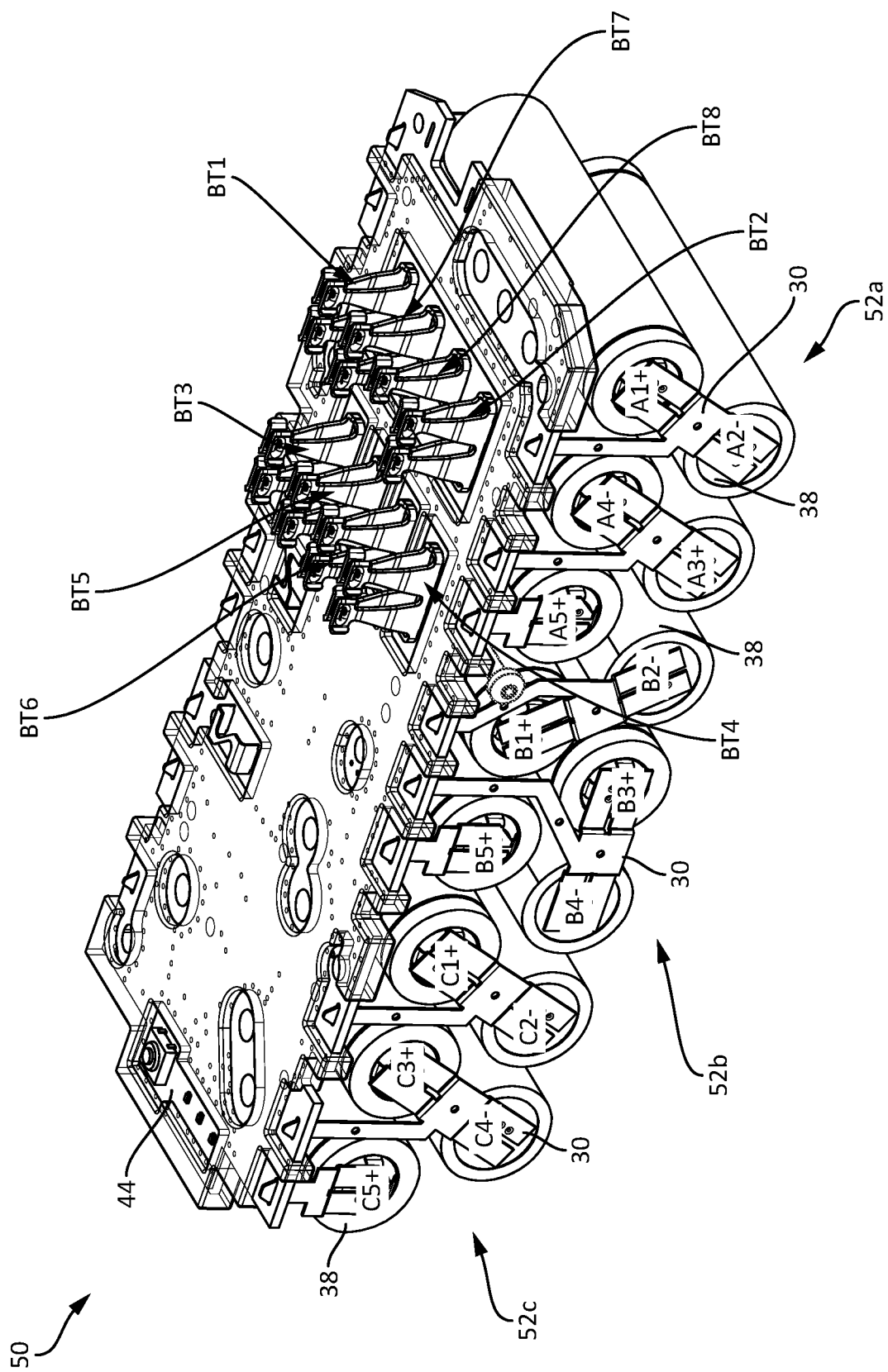
FIG. 15 is a rear, right side isometric view of an exemplary core pack of the present invention.
Figure 16:
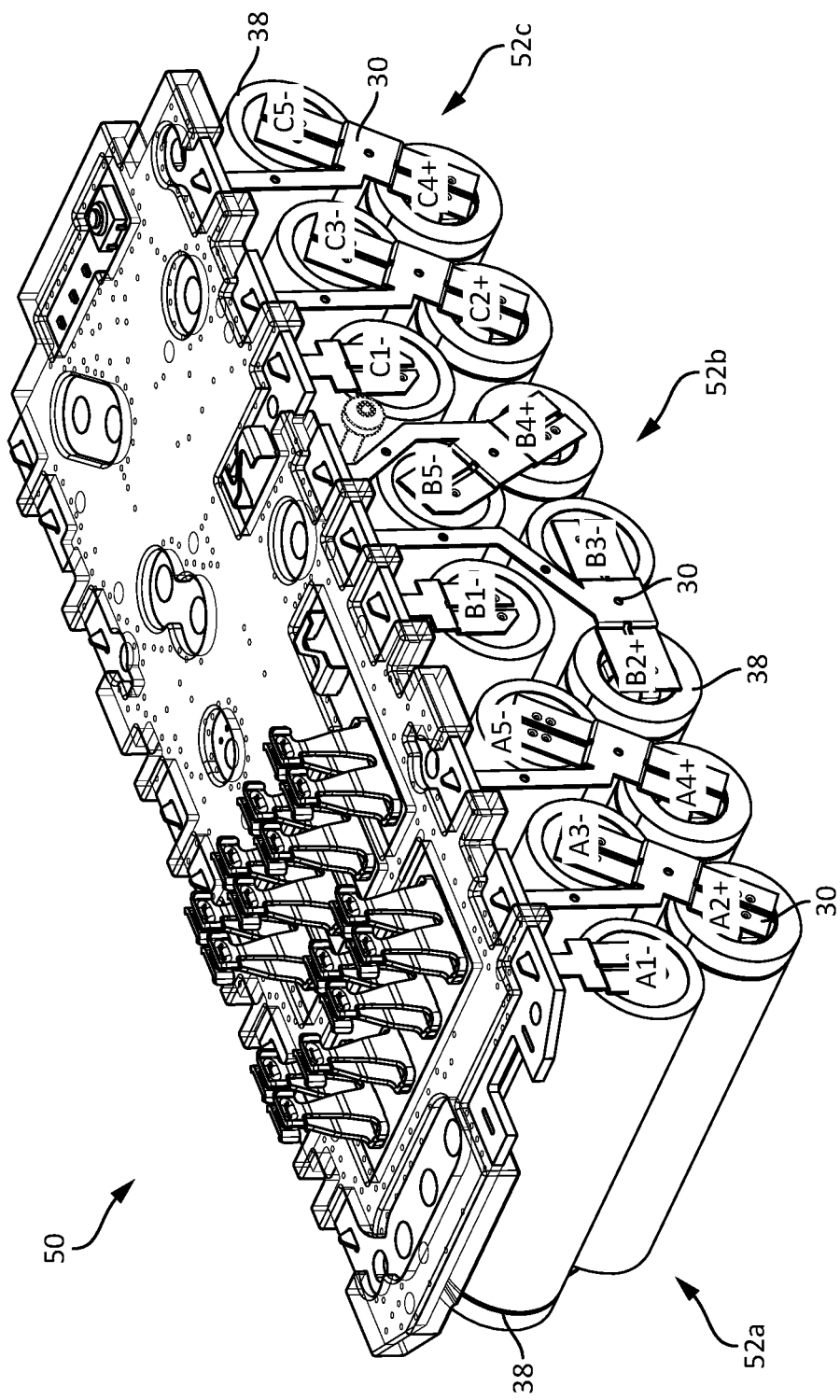
FIG. 16 is a rear, left side isometric view of the core pack of FIG. 15.
Figure 17:
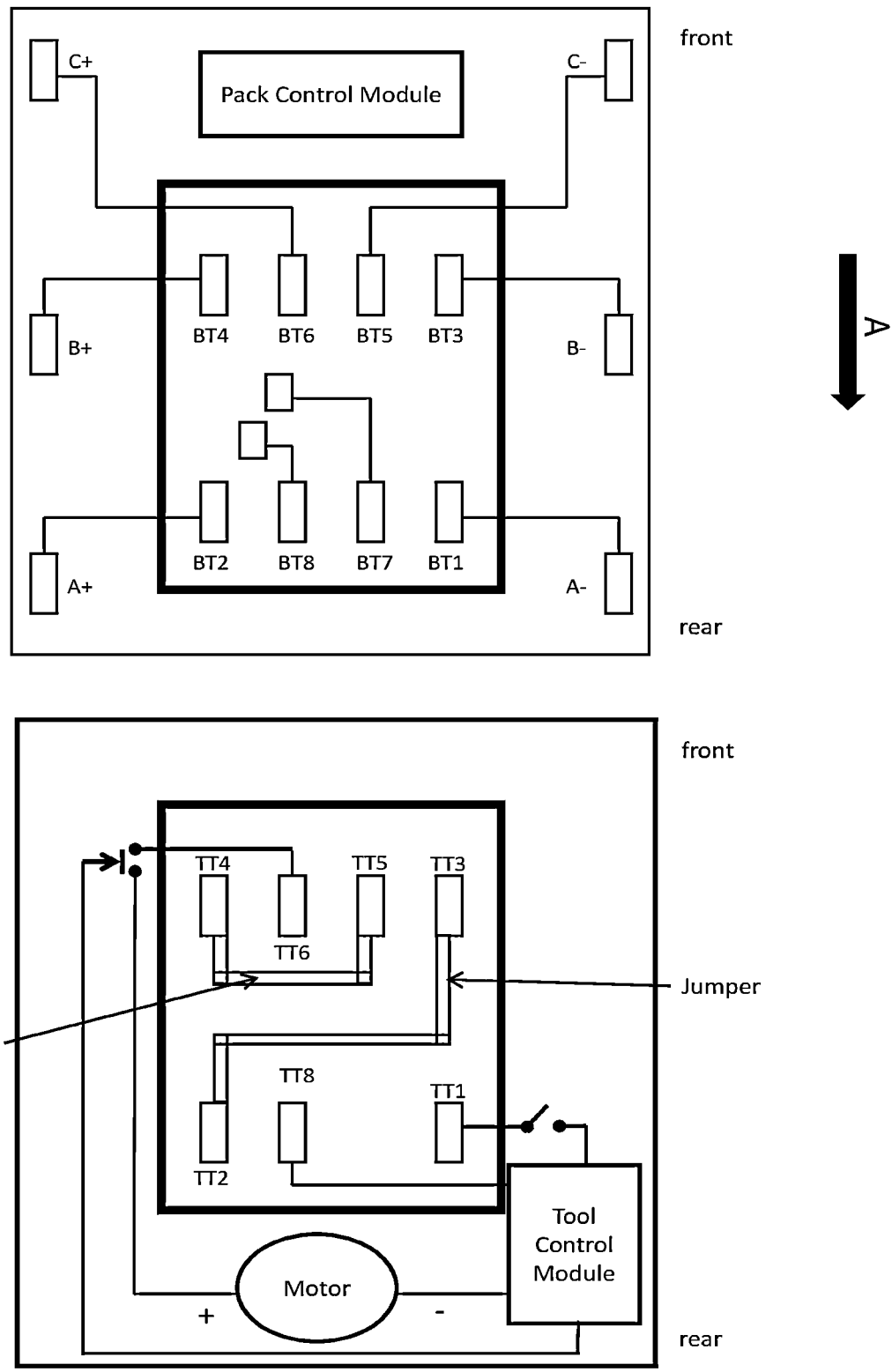
FIG. 17 is a simplified schematic of the battery pack of FIG. 1 and an exemplary power tool prior to mating.

FIGS. 15 and 16 illustrate a first exemplary embodiment of a core pack 50 of the first battery pack 10, In this embodiment, the core pack 50—and therefore the battery pack 10 includes fifteen battery cells 38. The battery cells 38 are configured in three sets of five cells—an A set 52a, a B set 52b and a C set 52c. The five cells 38 in each set 52a, 52b, 52c are connected in series and the three sets 52a, 52b, 52c are connected in series—when coupled to a power tool 200. Each set 52a, 52b, 52c is referred to as 5S1P-five cells in series.

The sets of cells 52a, 52b, 52c are configured to minimize the amount of space required. Specifically, each the cells 38 of each set 52a, 52b, 52c are positioned relative to each other the same way but the B set 52b is rotated about an axis in the center of the set that is parallel to a longitudinal axis of the battery cells 38. Furthermore, the A set 52a and the C set 52c have the same orientation. As such, the B set 52b is sandwiched between the A set 52a and the C set 52c to minimize the space the cells 38 require in a direction perpendicular to the longitudinal axis of the battery cells and in a direction parallel to the insertion direction.

In other words, each set of cells 52a, 52b, 52c includes three cells 30 adjacent to each other and aligned with their longitudinal axes in a first plane and two cells 30 adjacent to each other and aligned with their longitudinal axes in a second plane that is parallel to the first plane. Furthermore, adjacent sets of cells 52a, 52b, 52c are arranged such that the first plane of the first set 52a is in the same plane as the second plane of the second set 52b and the second plane of the first set 52a is in the same plane as the first plane of the second set 52b.

Specifically, the first plane of the A set 52a is in the same plane as the second plane of the B set 52b and the second plane of the A set 52a is in the same plane as the first plane of the B set 52b. The same is true of the B set 52b and the C set 52c. This provides a particularly compact core pack 50—and battery pack 10—in the insertion direction.

Figure 18:
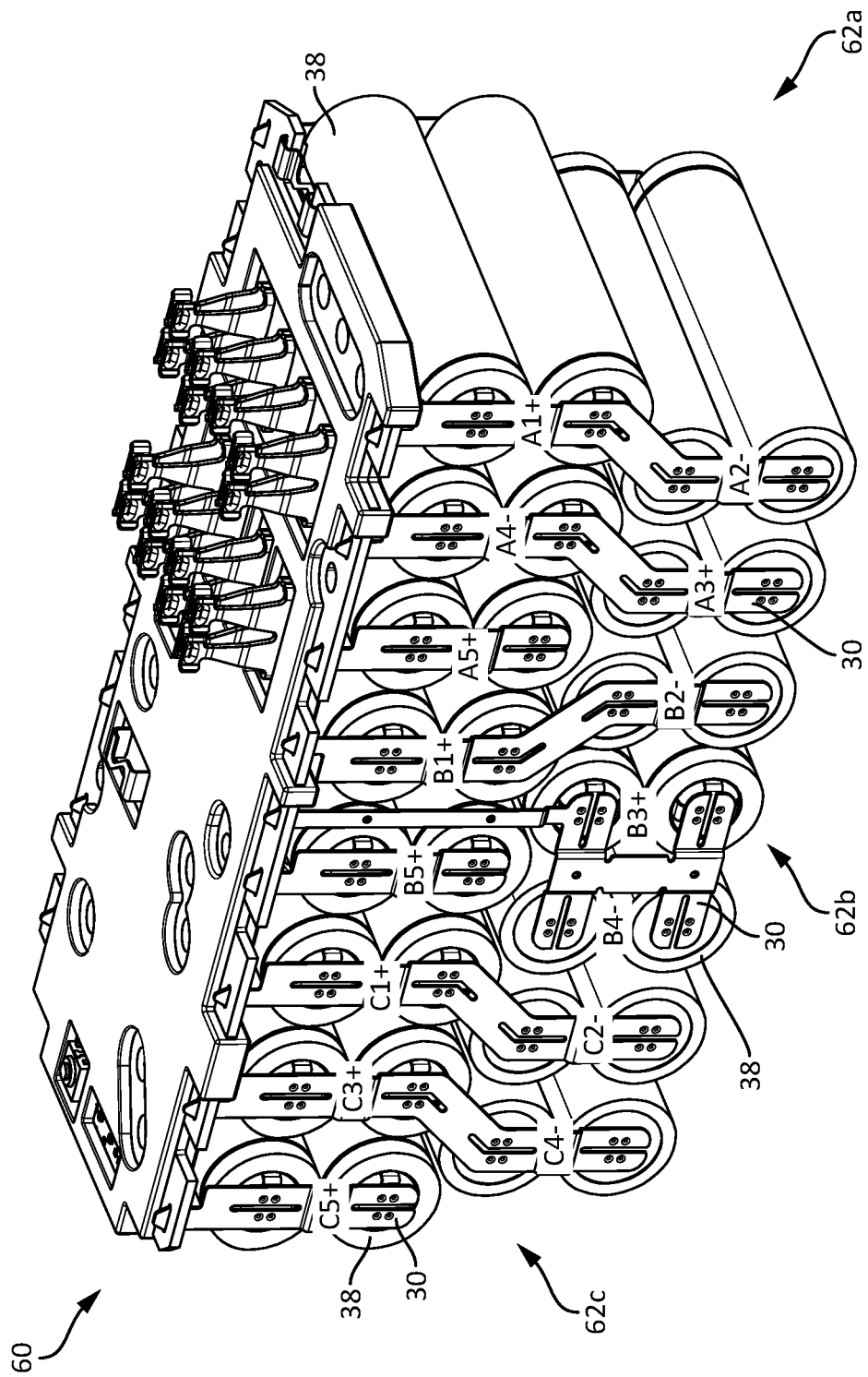
FIG. 18 is a rear, right side isometric view of another exemplary core pack of the present invention.
Figure 19:
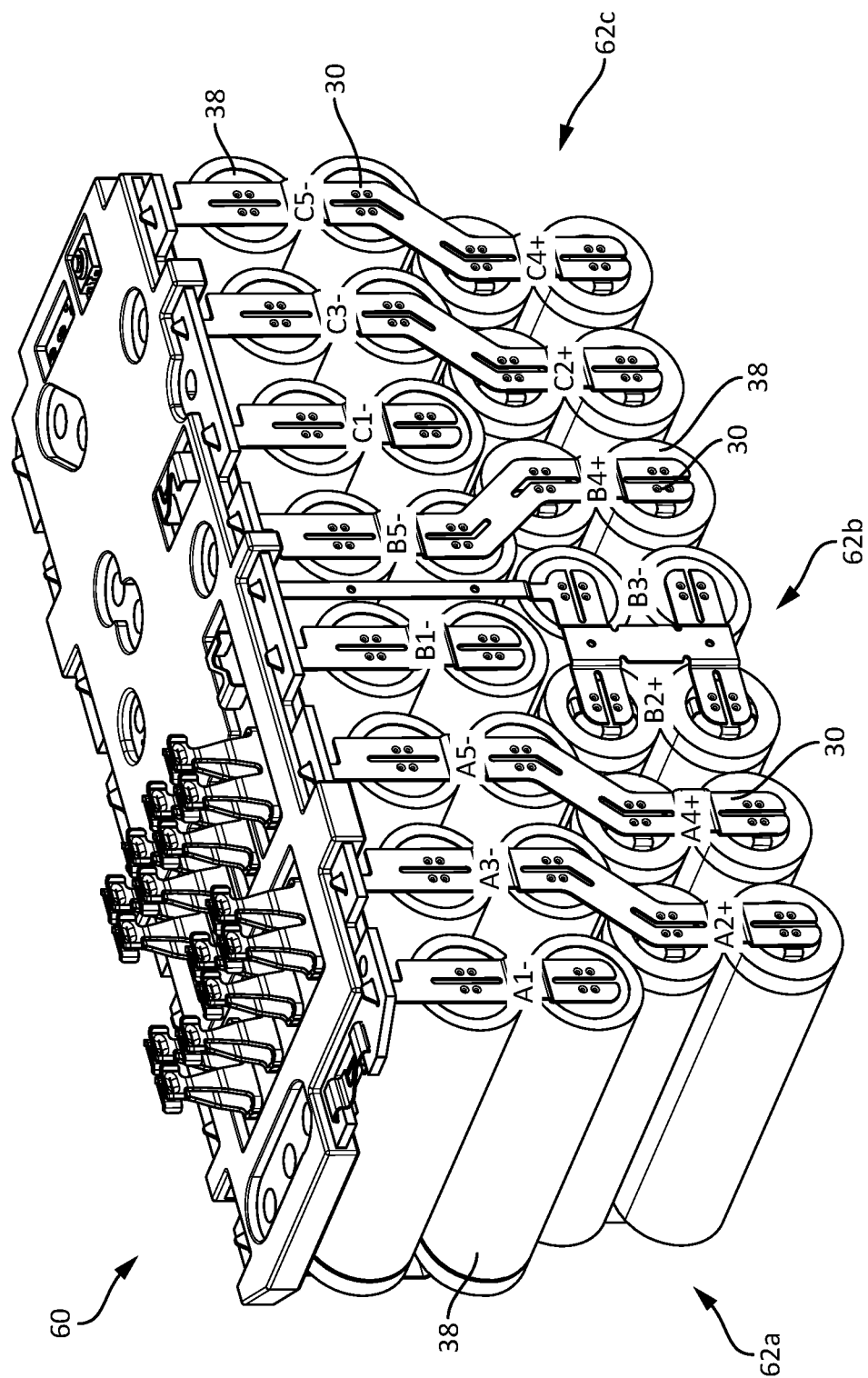
FIG. 19 is a rear, left side isometric view of the core pack of FIG. 18.

Referring to FIGS. 18 and 19, another exemplary embodiment of a core pack 60 is illustrated. In this embodiment, there are still three sets of battery cells 62a, 62b, 62c and the three sets 62a, 62b, 62c are connected in series, however each set 62a, 62b, 62c includes ten battery cells 30, In this embodiment, in each set of battery cells 62a, 62b, 62c there are five subsets of two battery cells 30 wherein the two battery cells 30 of each subset are connected in parallel and the five subsets are connected in series. This results in the same voltage as the previous embodiment but with twice the capacity assuming the same battery cells in each embodiment. In this embodiment, each set 62a, 62b, 62c is referred to as 5S2P five subsets in series with each subset having two battery cells 30 in parallel.

Again, the sets of battery cells 62a, 62b, 62c are arranged to minimize the space in the dimension in the insertion direction, similar to the previous embodiment.

Figure 21:
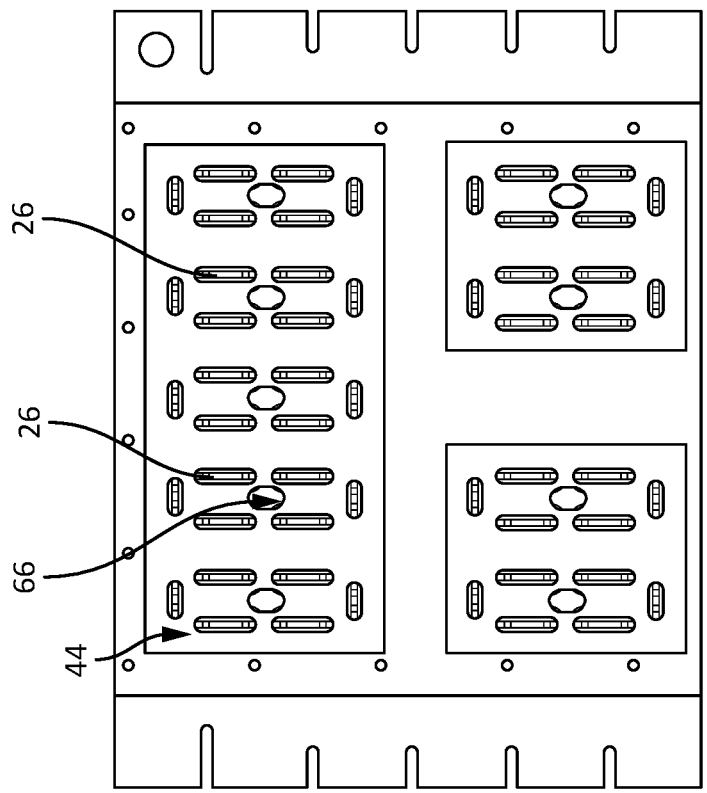
FIG. 21 is a plan view of the printed circuit board of FIG. 20.
Figure 20:
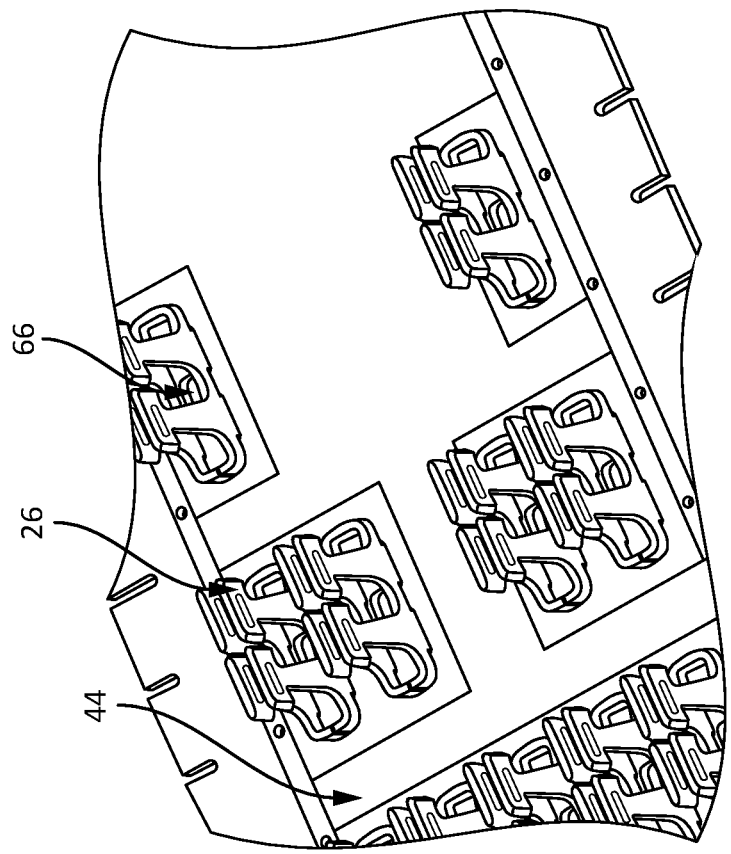
FIG. 20 is an isometric view of an exemplary printed circuit board of the present invention.
Figure 22:
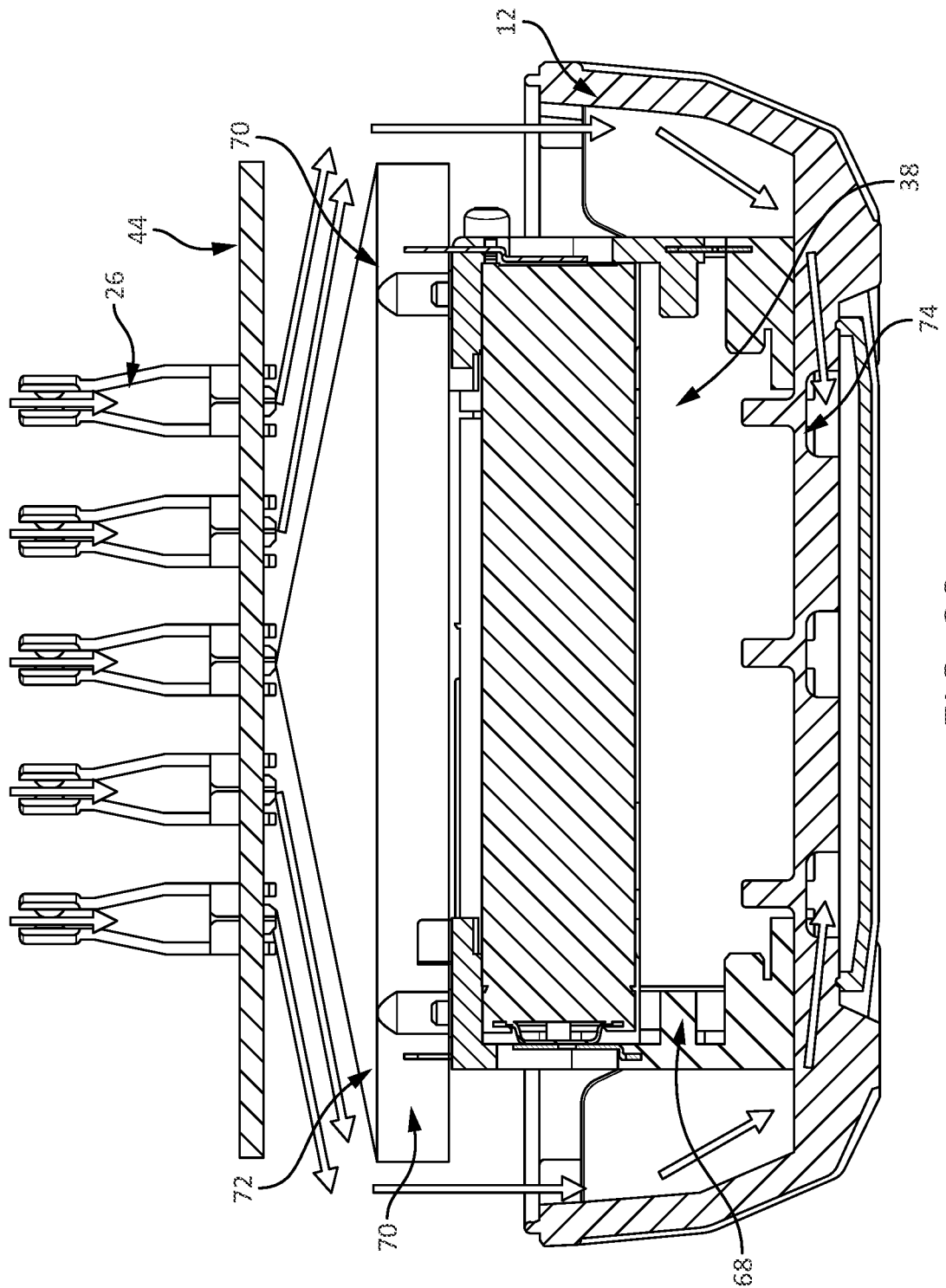
FIG. 22 is a section view of the printed circuit board of FIG. 21 and a portion of an exemplary battery pack of the present invention.
Figure 23:
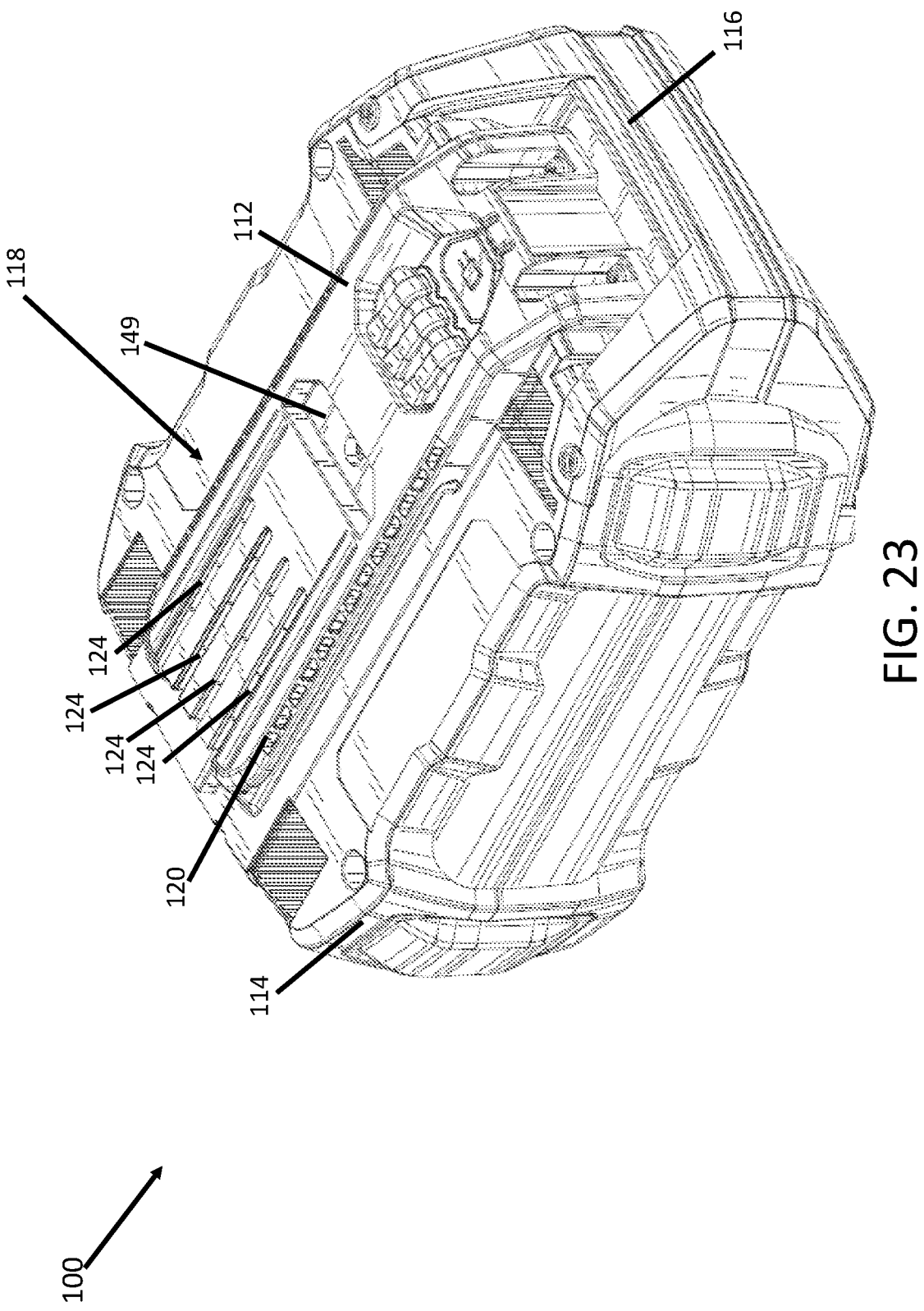
FIG. 23 is a top, front, left side isometric view of another exemplary battery pack of the present invention.
Figure 24:
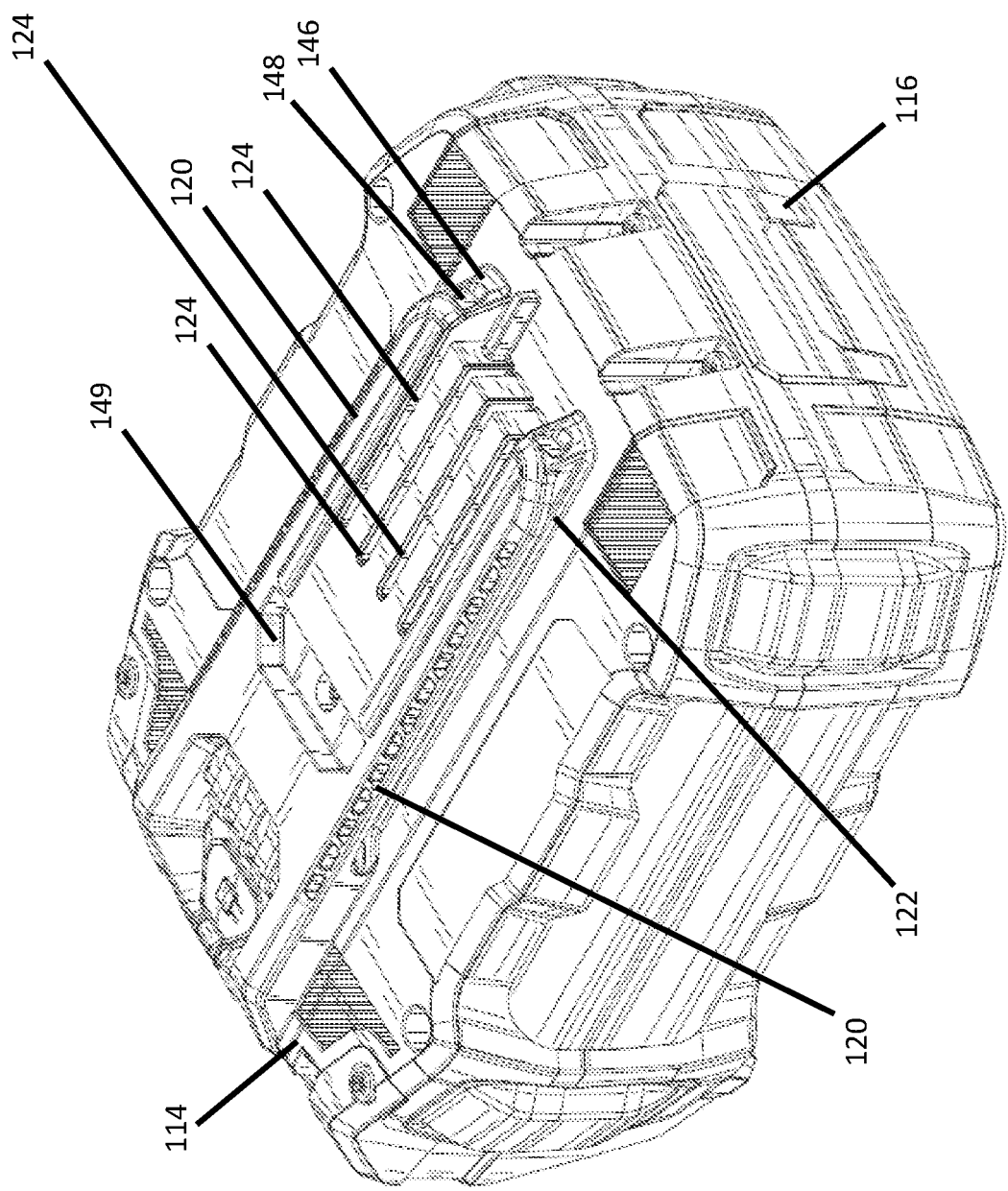
FIG. 24 is a top, rear, right side isometric view of the battery pack of FIG. 23.

Referring to FIGS. 20 through 22, there is illustrated an exemplary embodiment for distributing and removing water that gets into the battery pack housing 12, As illustrated in FIGS. 20 and 21, a plurality of battery terminals 26 are attached to a printed circuit board 44, The printed circuit board 44 includes a hole 66 located within a footprint of the terminal 26. This would allow any trapped water to pass through the PCB 44 down onto the cell holder 68, FIG. 22 illustrates a path—indicated by the arrows—the water would take after it passes through the PCB 44. The battery pack 10 would include a cell holder 68 having a top or cap 70 having slanted surfaces 72. After the water passes through the PCB 44 it would run down the slanted surfaces 72 of the cell holder cap 70. The water would then flow down to interior sides of the pack housing 12 and then out of drain holes 74 in a bottom wall 76 of the battery pack housing 12.

Referring to FIGS. 23 through 28, an exemplary embodiment of a second battery pack 110 is illustrated. The second battery pack 110 includes a mechanical interface 118 virtually identical to the mechanical interface 18 of the first battery pack 10. As such, the second battery pack 110 will be able to mate with the same power tools 200 as the first battery pack 10—unless the manufacture desires to prevent the second battery pack 10 from mating with tools 200 that the first battery pack 10 is intended to mate (or vice versa) in which case the mechanical interface 18/118 of one or the other of the battery packs 10/110 may include some type of lockout. As noted above, the second battery pack 100 includes a plurality of slots 124 to receive the power tool terminals 206. These slots 124 define a plurality of parallel planes. The second battery pack 110 has a width Z in a dimension perpendicular to the planes defined by the slots 124. This width Z is greater than the width Y of the first battery pack 10. Yet due to both battery packs 10/110 having the same mechanical interface 18/118, both battery packs 10/110 are capable of mating and operating with the same power tools 200.

As such, there may be a power tool system including at least one power tool 200 having a plurality of terminals 206, a first battery pack 10 having a mechanical interface 18 for mating with the at least one power tool 200, the mechanical interface 18 of the first battery pack 10 including a plurality of slots 24 for receiving the plurality of power tool terminals 206, the plurality of slots 24 of the first battery pack 10 defining a plurality of parallel planes, the first battery pack 10 having a housing 12, the first battery pack housing 12 having a width dimension in a direction perpendicular to the planes defined by the plurality of slots 24, and a second battery pack 110 having a mechanical interface 118 for mating with the at least one power tool 200, the mechanical interface 118 of the second battery pack 110 including a plurality of slots 124 for receiving the plurality of power tool terminals 206, the plurality of slots 124 of the second battery pack 110 defining a plurality of parallel planes, the second battery pack 110 having a housing 112, the second battery pack housing 112 having a width dimension Z in a direction perpendicular to the planes defined by the plurality of slots 124, wherein the width dimension Z of the second battery pack 100 is greater than the width dimension Y of the first battery pack 100. In one embodiment, the width dimension Z of the second battery pack 100 is at least 1.5 times the width dimension Y of the first battery pack 10.

Figure 29:
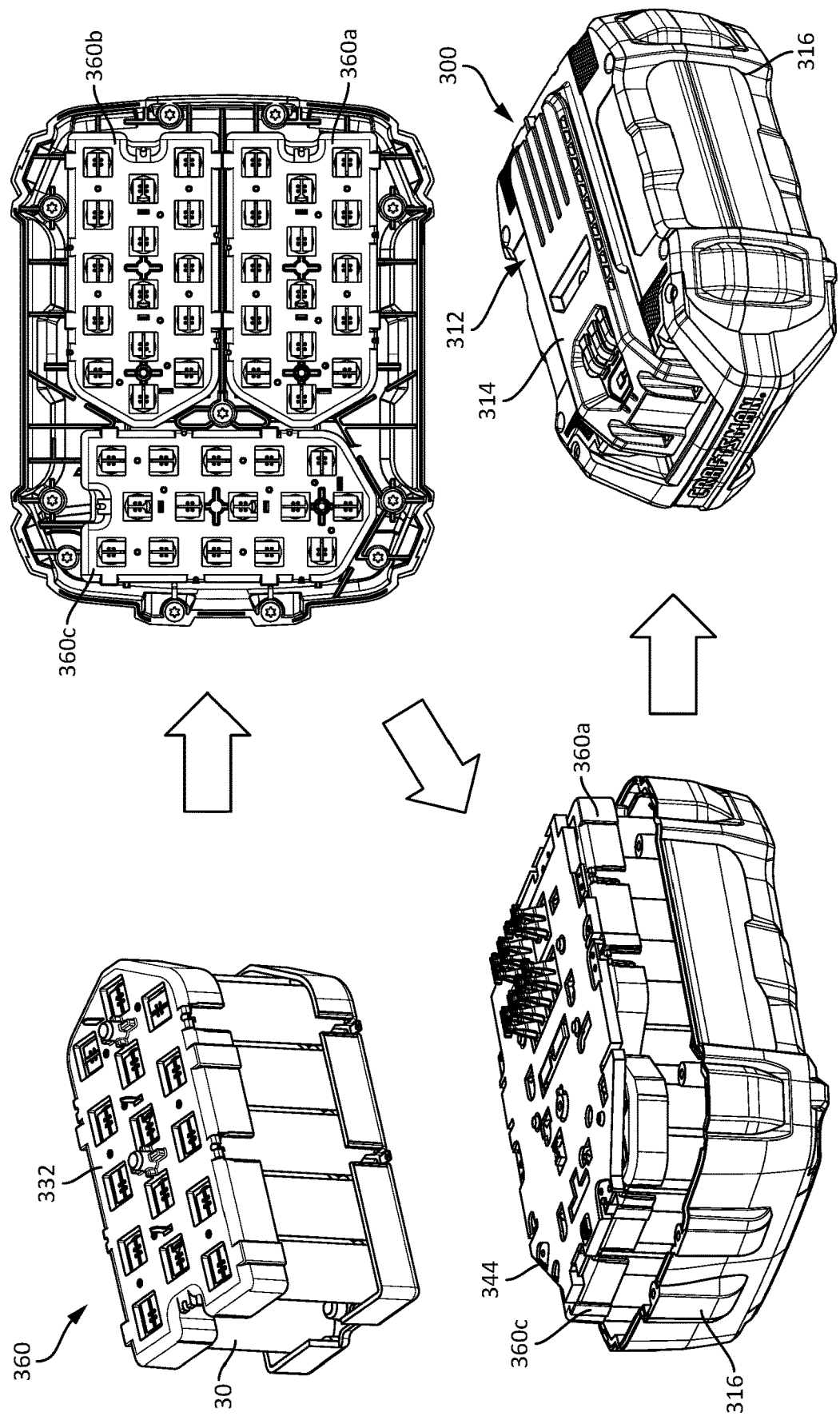
FIG. 29 is a view an exemplary assembly process of the battery pack of FIG. 23.
Figure 31:
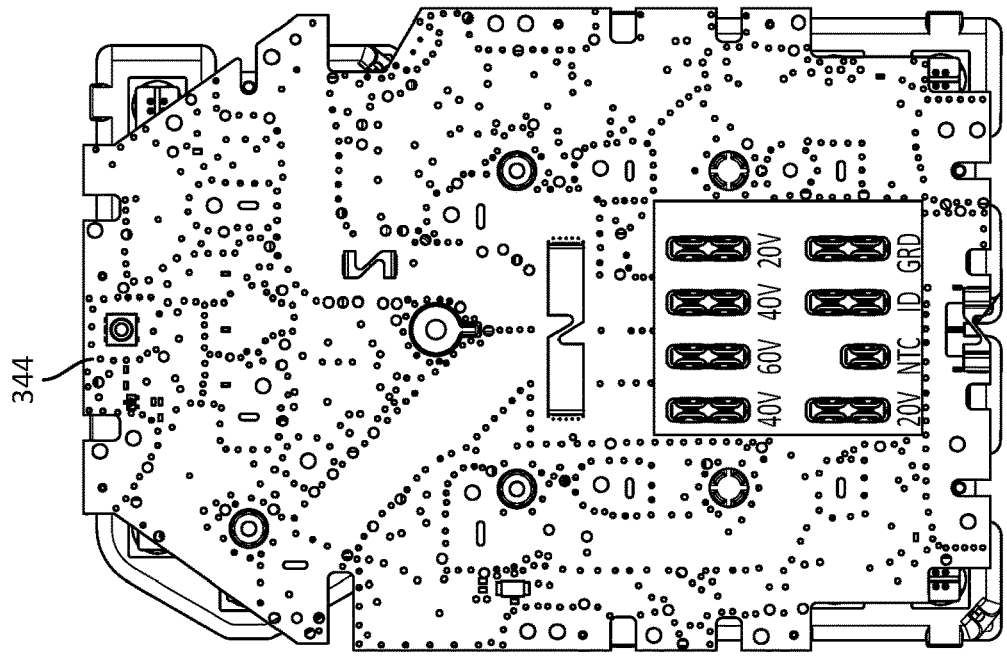
FIG. 31 is a plan view of printed circuit board assembled to the plurality of core packs of FIG. 30.
Figure 30:
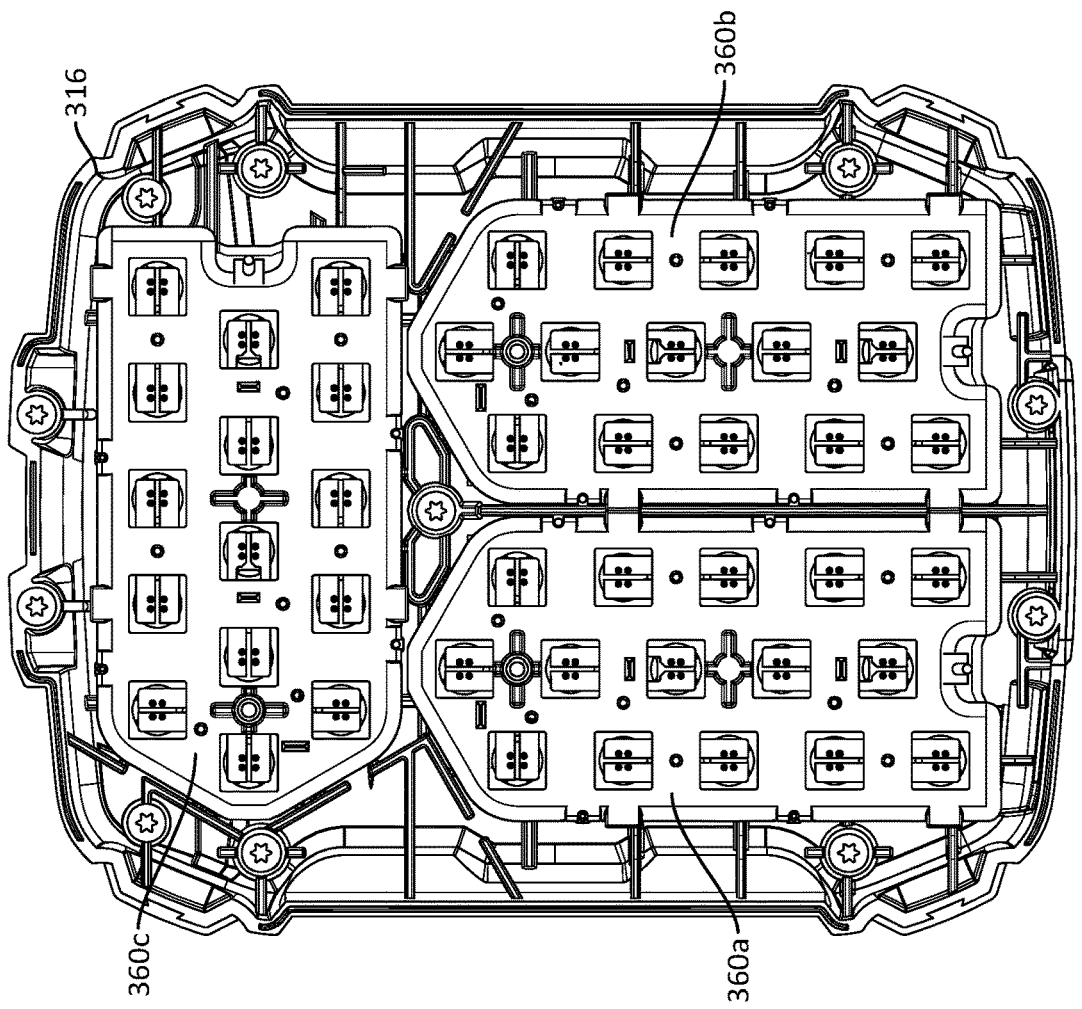
FIG. 30 is a plan view of a plurality of modular core packs assembled in a lower housing of the battery pack of FIG. 23.

FIGS. 29, 30 and 31 illustrate a third exemplary battery pack 300 having a modular core pack 360. In this exemplary embodiment, the third battery pack 300 includes a plurality of core pack modules 360a, 360b, 360c. Each module 360a, 360b, 360c includes a plurality of battery cells 30 held in relative position to each other by a cell holder 332.

In an exemplary embodiment, the second battery pack 300 is a 60-volt rated battery pack having a relatively high capacity (Amp-hour rating). To achieve this voltage and capacity, the battery pack 300 includes forty-five battery cells 30.

When using so many battery cells in a battery pack 300 is not unheard of to have one or more of the battery cells 30 fail or become unfit during the manufacture and assembly of the cells 30 and/or the pack 300. In this instance, if all forty-five cells were assembled into a single core pack and if a single cell of that single core pack were to be found unusable the entire core pack of forty-five cells would need to be thrown away—resulting in a significant waste of materials.

In order reduce waste associated with placing so many cells 30 into a battery pack 300, a modular approach has been taken. In this approach, in this exemplary embodiment, each module 360a, 360b, 360c includes fifteen four-volt cells 30. Each module 360a, 360b, 360c includes five sets of three four-volt cells 30 wherein the three four-volt cells 30 are connected in parallel and the five sets are connected in series. As such, each set of cells is rated at four volts and each module is rated at twenty (20) volts. The three modules 360a, 360b, 360c are connected in series through connections to and through the printed circuit board 344 resulting in a sixty (60) volt rated battery pack.

In this approach, if a cell 30 of a particular module 360a, 360b, 360c is found to be unfit, then the single module can be removed wasting only fifteen cells—instead of wasting the entire forty-five cells.

As illustrated in FIG. 29, the modular cores 360a, 360b, 360c are assembled in a first step. The battery cells 30 of the module are tested. If any of the battery cells 30 are found to be unfit in a particular module that particular module is thrown away. Three of the modules 360a, 360b, 360c are placed in a lower housing/portion 316 of the battery pack housing 312. A printed circuit board 344 is assembled with the plurality of modules 360a, 360b, 360c to electrically connect the modules 360a, 360b, 360c to the battery pack terminals 326. The upper housing/portion 314 of the battery pack housing 312 may then be coupled to the lower housing/portion 316 of the battery pack housing 312 to complete the battery pack 300.

Figure 32:
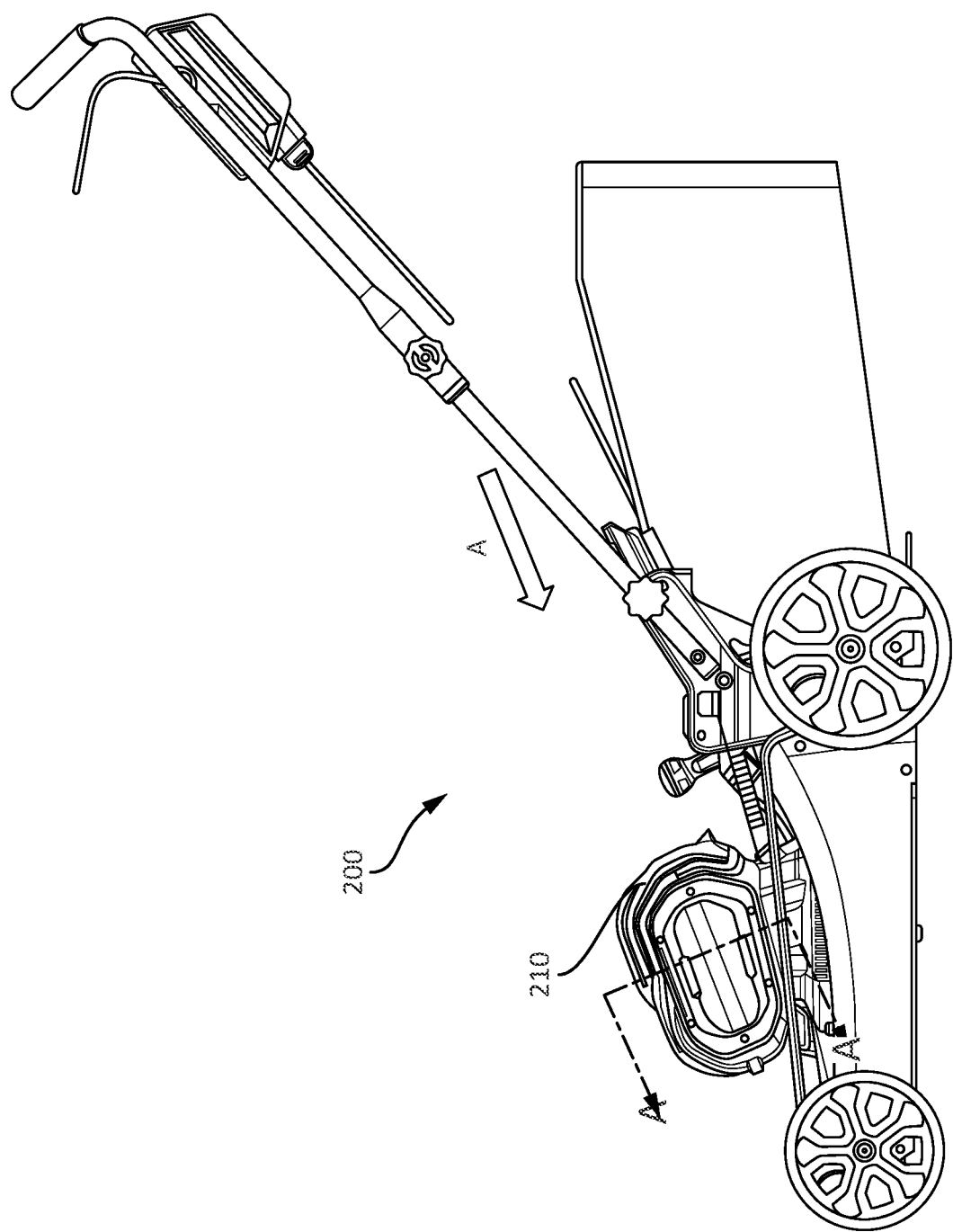
FIG. 32 is a side, elevation view of an exemplary power tool for use with the battery packs of FIGS. 1 and 23.
Figure 33:
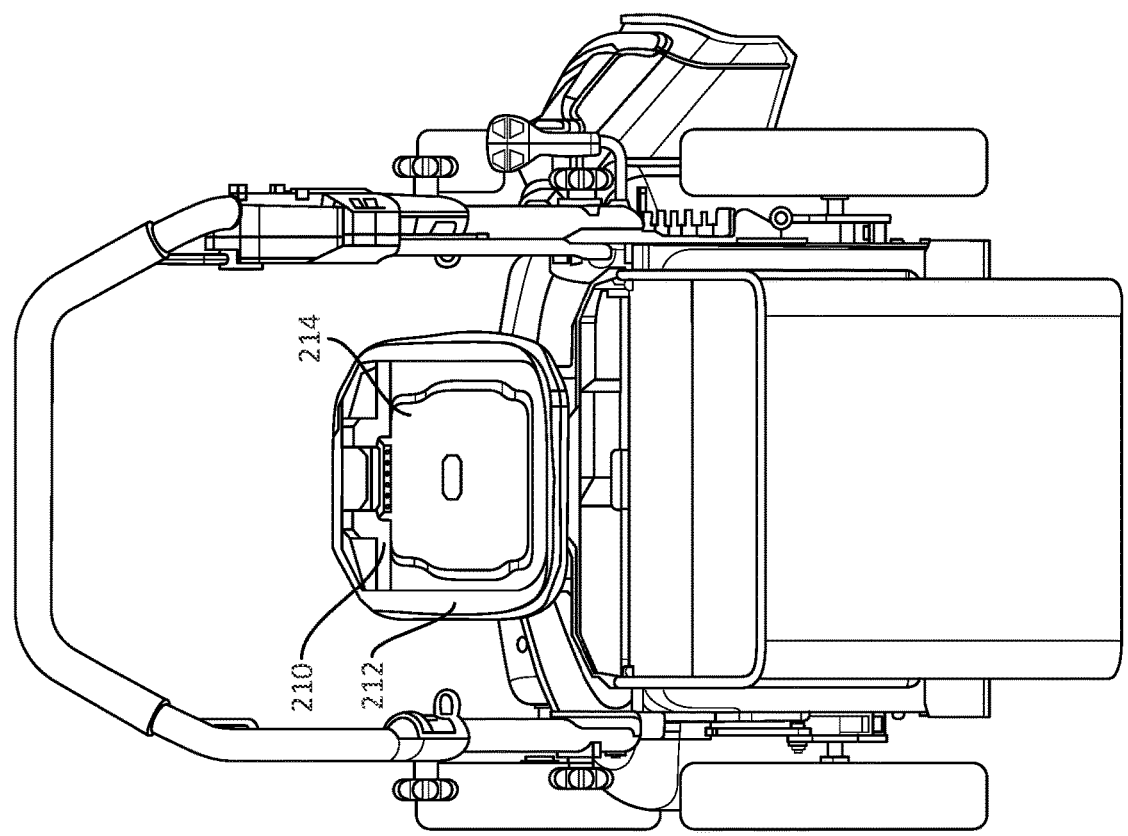
FIG. 33 is an isometric view of the power tool of FIG. 32 in the direction of arrow A.

FIGS. 32 and 33 illustrate an exemplary power tool 200 that may be powered by either of the first exemplary battery pack 10, the second exemplary battery pack 100 or the third exemplary battery pack 300. In this instance, the exemplary power tool 200 is a lawn mower. However, other power tools may also be configured to utilize the battery packs 10/100/300, for example, chain saws. The lawn mower 200 includes a receptacle 210 for receiving the battery packs 10/100/300— referred to as a battery pack receptacle 210.

Figure 7:
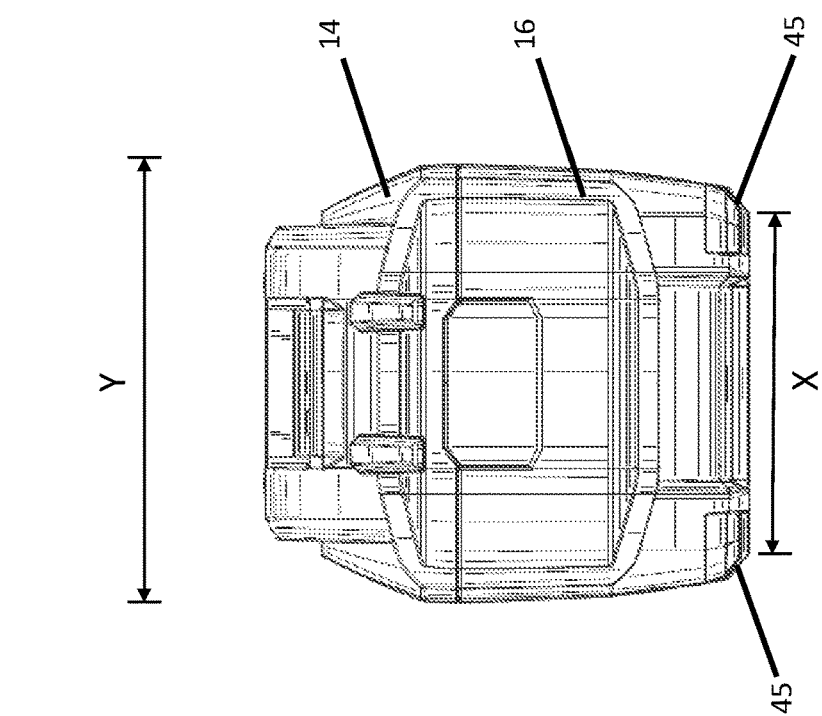
FIG. 7 is a front, elevation view of the battery pack of FIG. 1.
Figure 34:
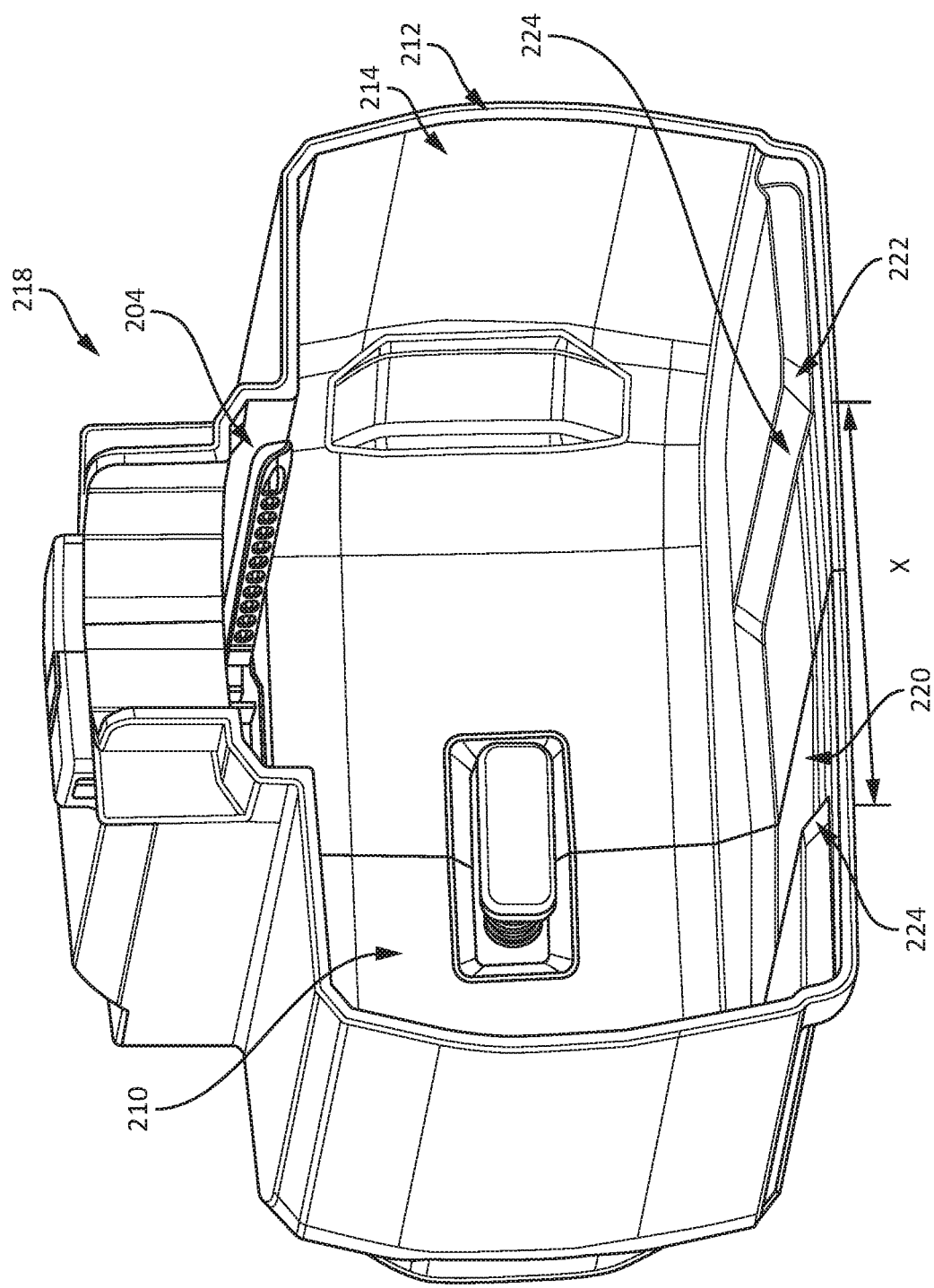
FIG. 34 is an isometric view of an exemplary battery receptacle of the power tool of FIG. 32.
Figure 35:
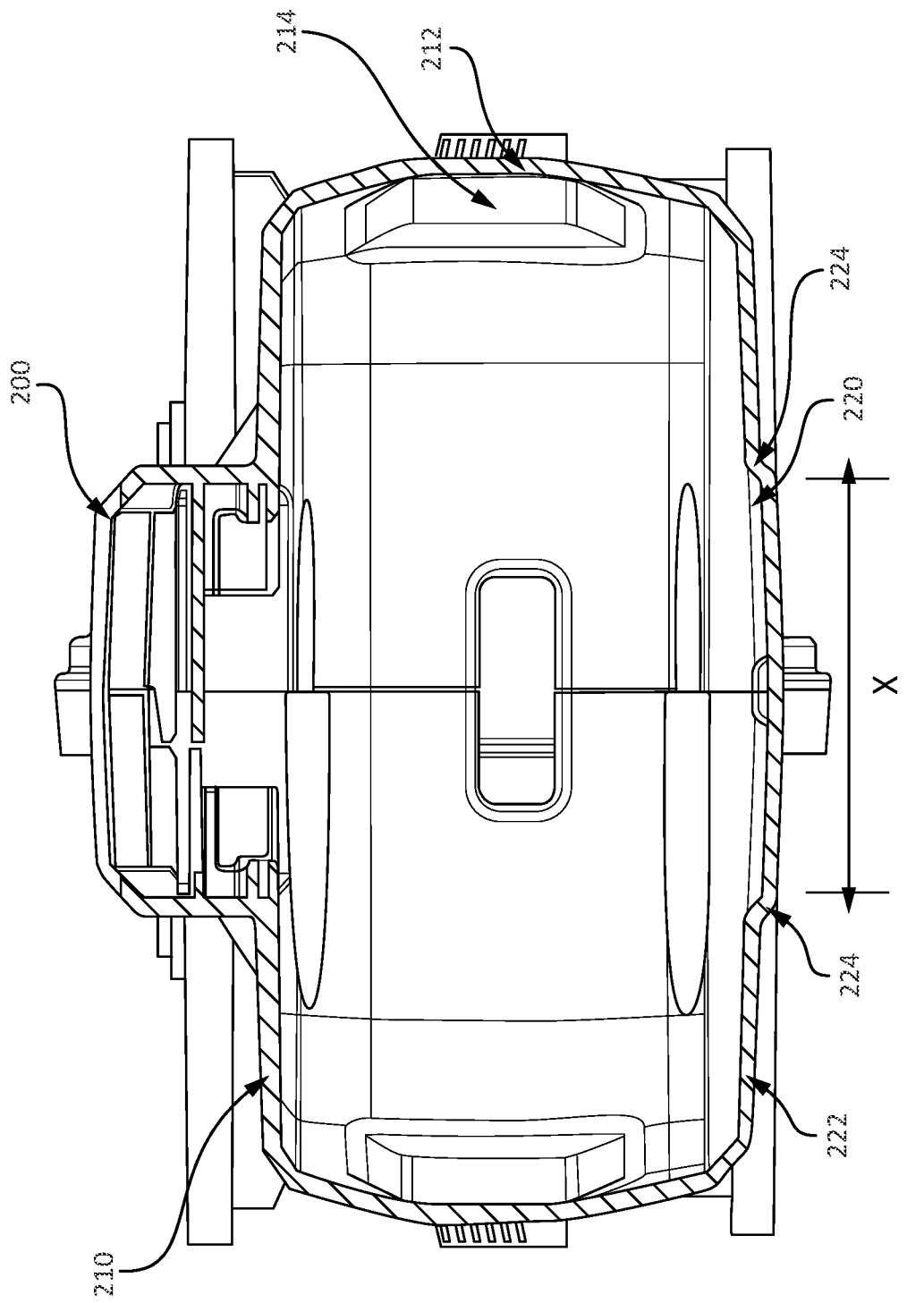
FIG. 35 is an elevation view of the battery receptacle of FIG. 34.
Figure 36:
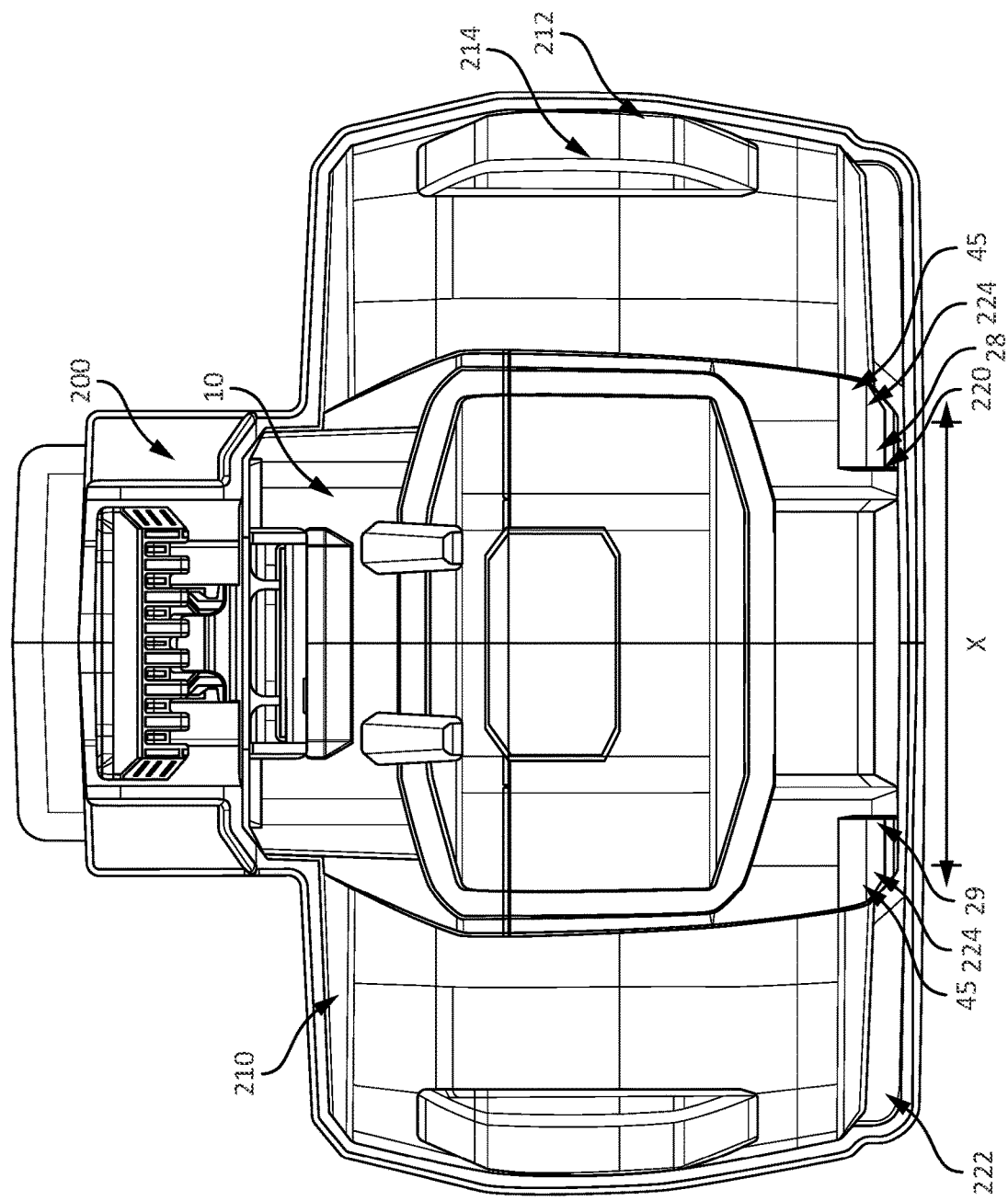
FIG. 36 is an elevation view of the battery pack of FIG. 1 in the battery receptacle of FIG. 34.

As illustrated in detail in FIGS. 34 and 35, the battery pack receptacle 210 includes a housing 212 defining a cavity/volume 214 for receiving the battery packs 10/100, The battery pack receptacle 210 includes a mechanical interface 218 for mating with the battery pack mechanical interface 18/118. The battery pack receptacle interface 218 (also referred to as a tool mechanical interface) includes a set of rails (tool rails) 204 that are received in the battery pack grooves 22/122. The battery pack receptacle mechanical interface 218 also includes a slot 220 in a wall 222 of the housing 212 opposed to the tool rails 204. The slot 220 has a dimension (width) X. In a preferred embodiment the slot 220 includes angled side walls 224. The dimension X of the slot 220 is equal to a dimension of a bottom wall 28 of the housing 12 of the first battery pack 10 of FIGS. 1 through 8. As illustrated in FIG. 7, the bottom wall 28 of the housing 12 (opposed to the portion of the housing 12 including the battery pack mechanical interface 18) may also include angled walls 45 to correspond with the angled walls 224 of the slot 220 of the battery pack receptacle 210. As illustrated in FIG. 36, when the first battery pack 10 is inserted into the battery pack receptacle 210 and mated with the power tool 200, the bottom wall 28 of the first battery pack 10 is received in the slot 220. As such, the slot 220 assists in holding the first battery pack 10 in place relative to the battery pack receptacle housing 210.

Figure 25:
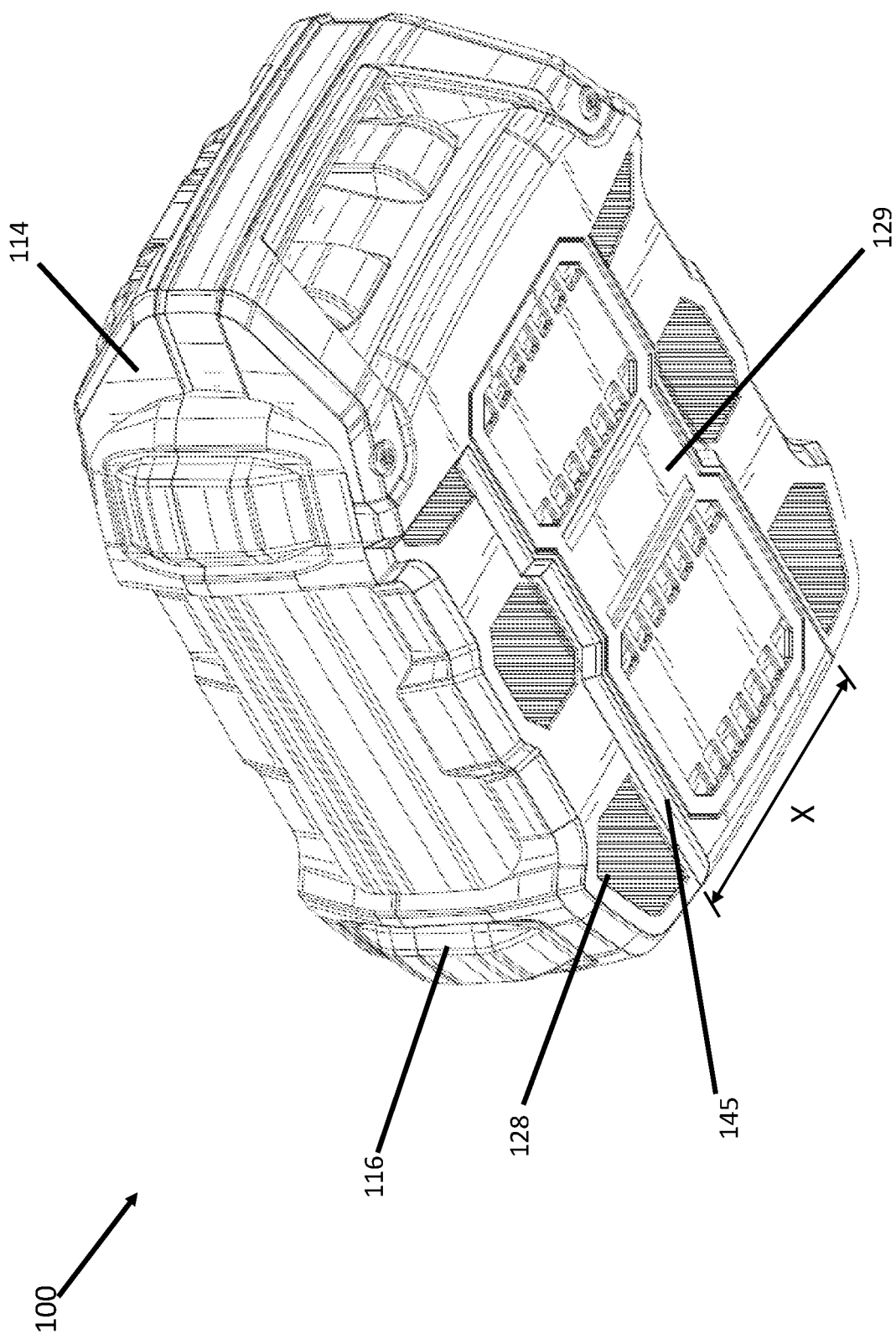
FIG. 25 is a bottom, front, left side isometric view of the battery pack of FIG. 23.
Figure 26:
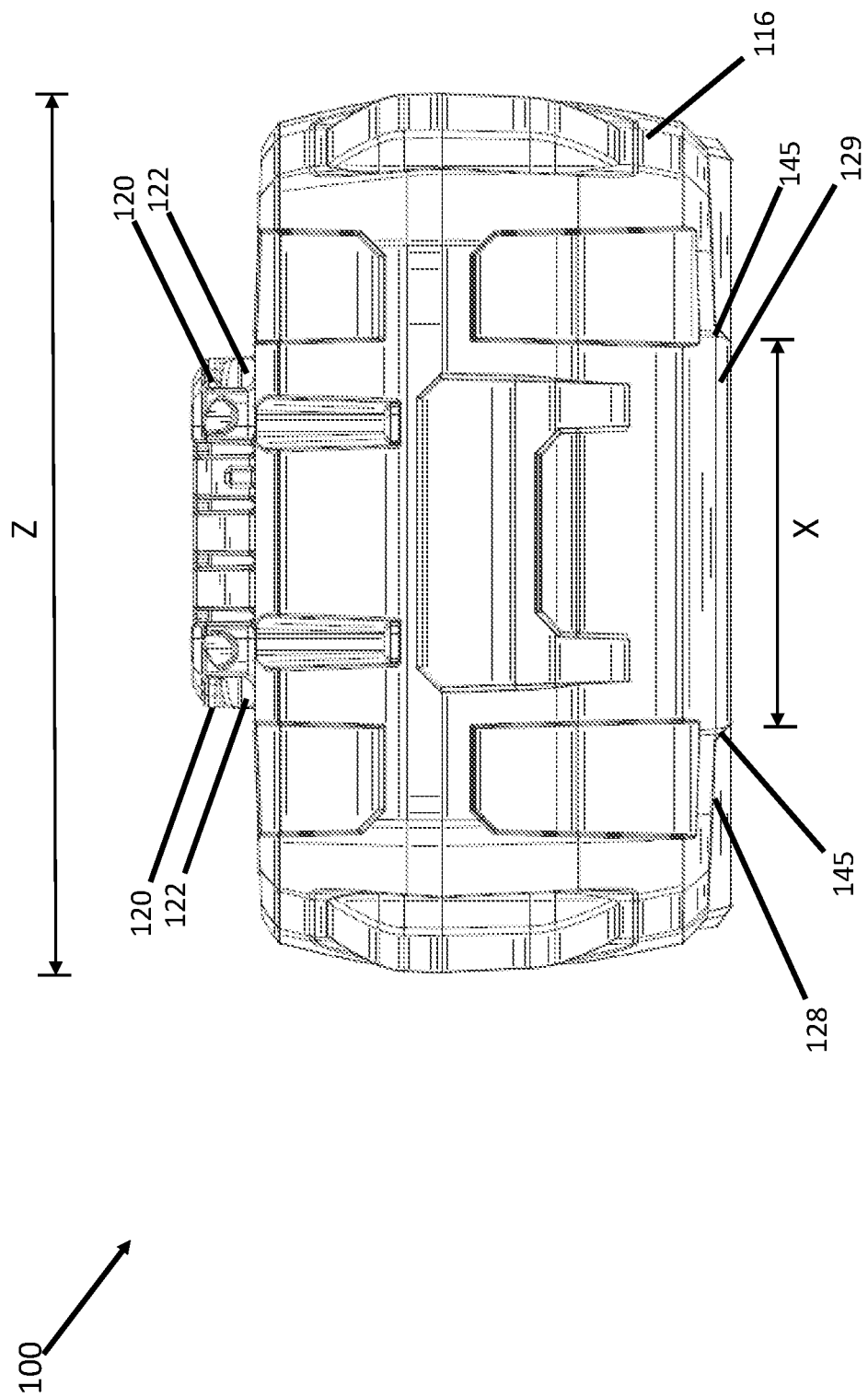
FIG. 26 is a rear, elevation view of the battery pack of FIG. 23.
Figure 27:
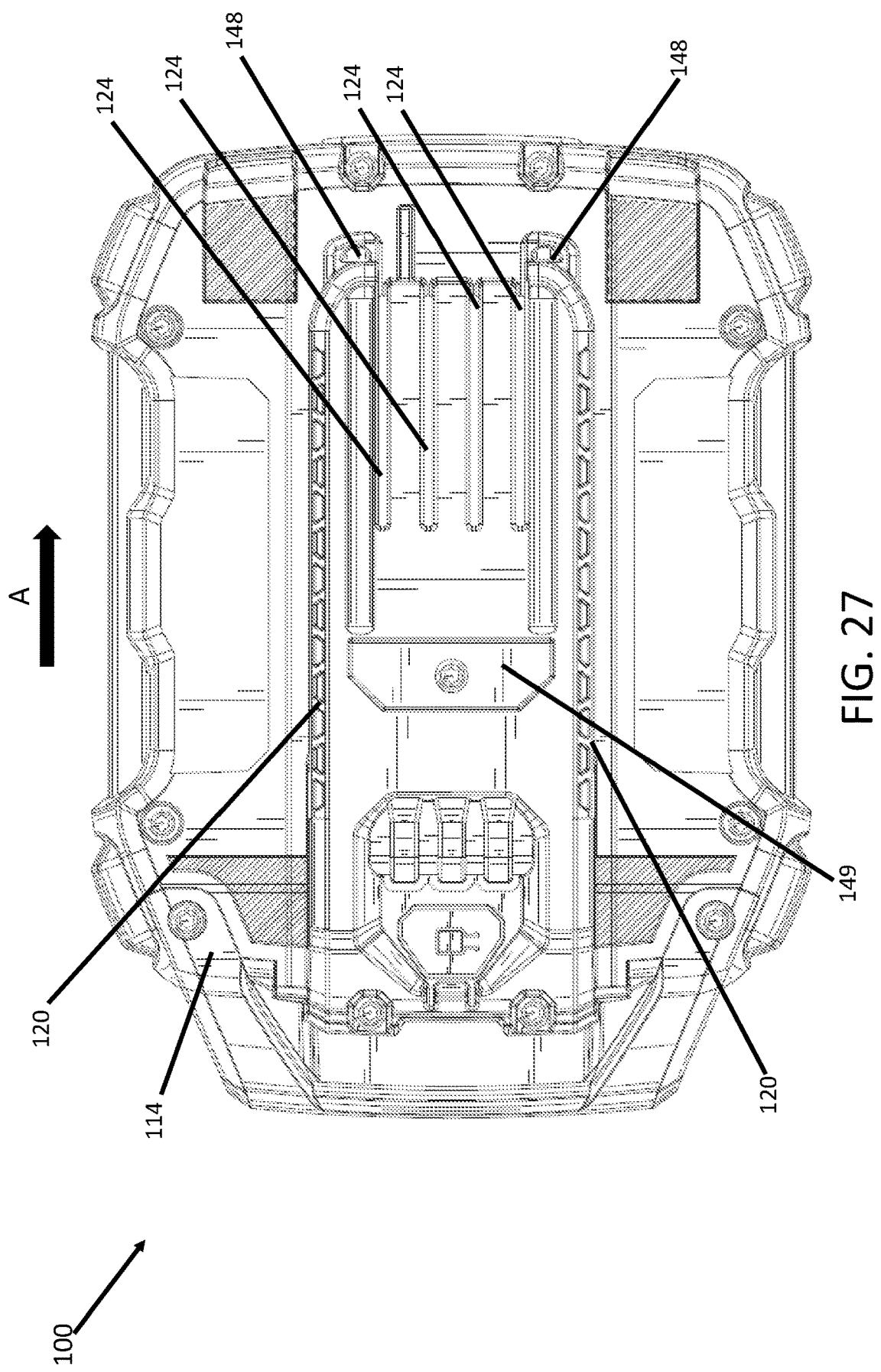
FIG. 27 is a top, plan view of the battery pack of FIG. 23.
Figure 28:
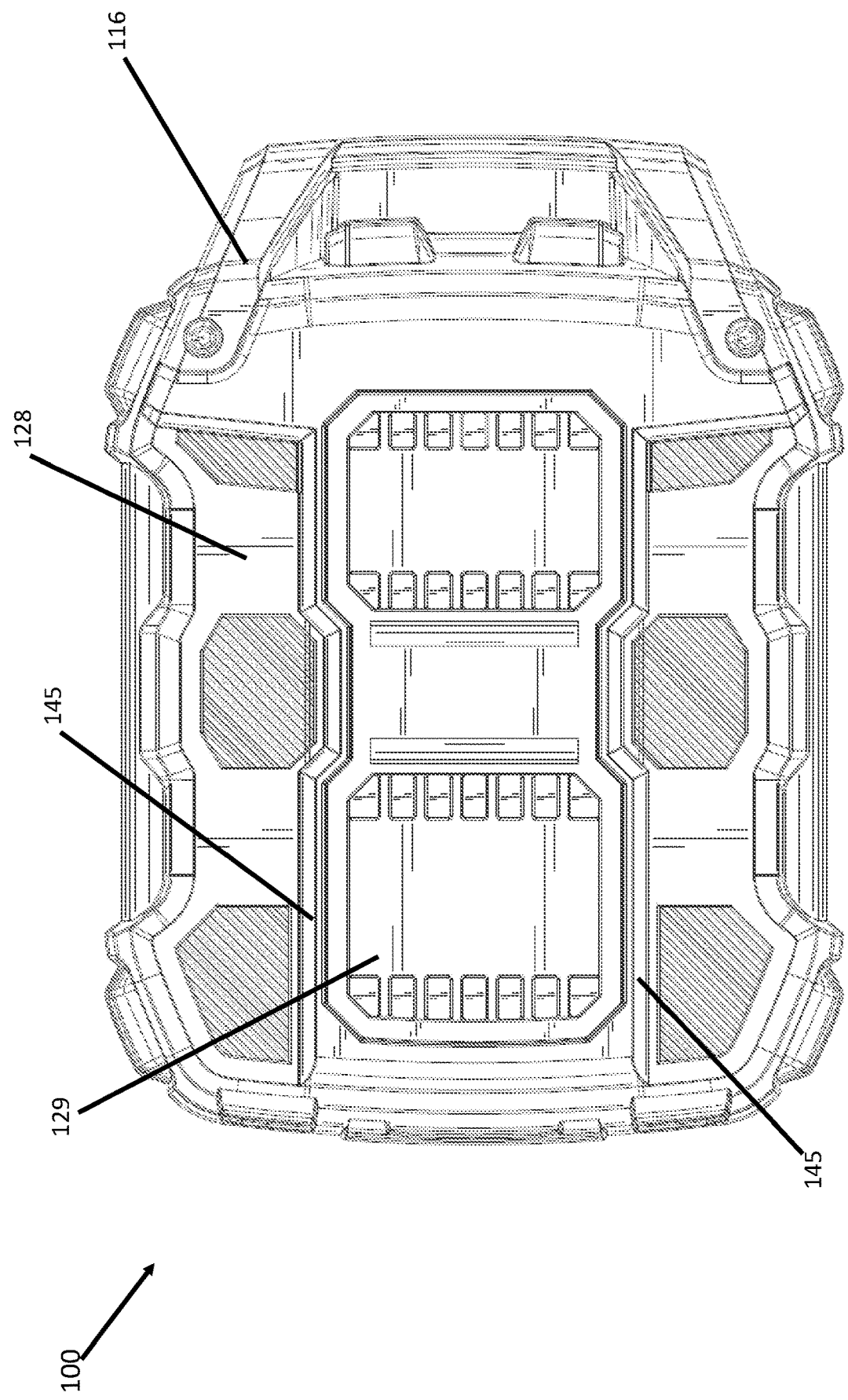
FIG. 28 is a bottom, plan view of the battery pack of FIG. 23.
Figure 37:
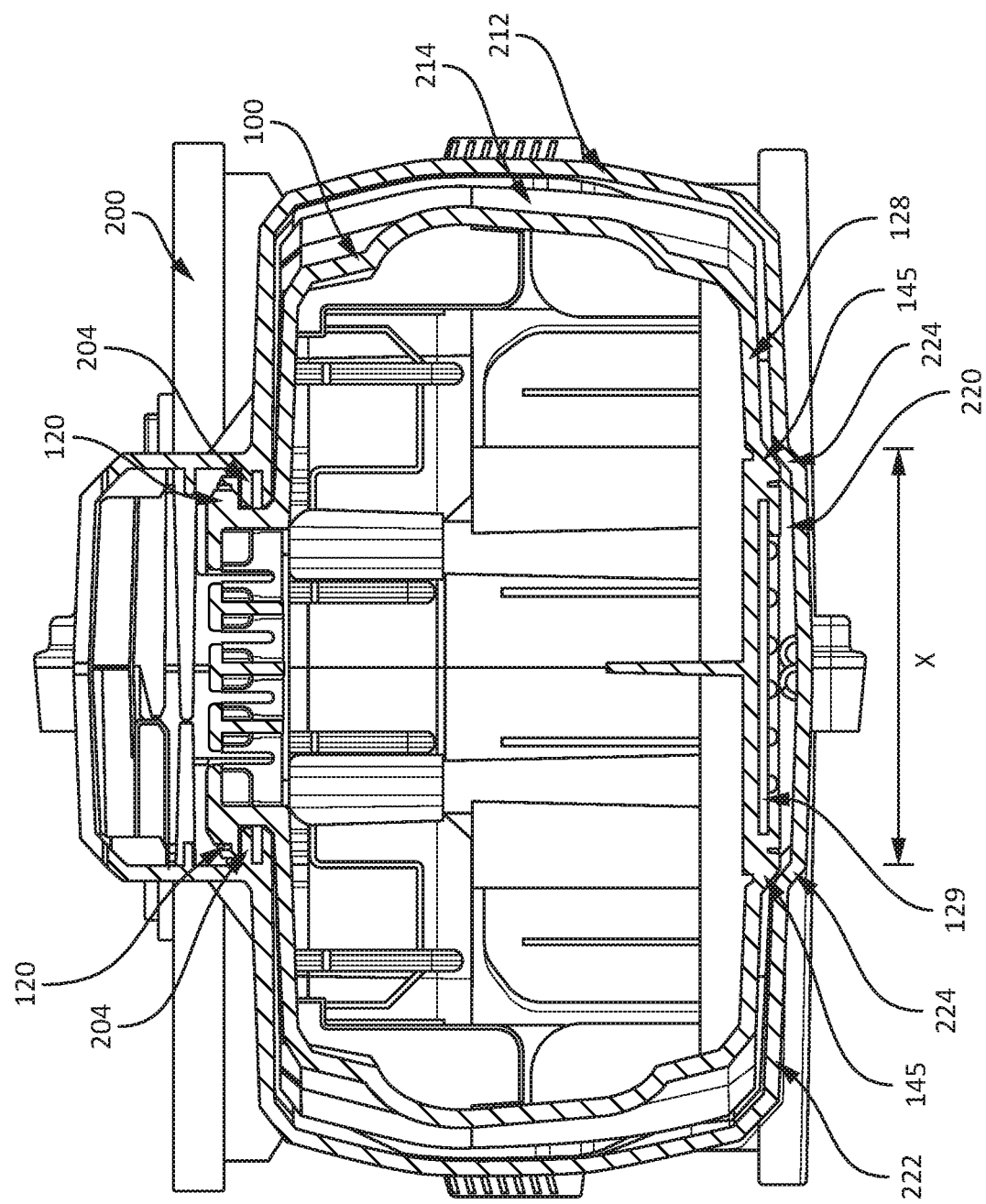
FIG. 37 is a section view of the battery pack of FIG. 23 in the battery receptacle of FIG. 34 along section line A-A of FIG. 32.

The second battery pack 100 illustrated in FIGS. 23 through 28 also includes a projected portion 129 of a bottom wall 128 of the battery pack housing 112. The projected portion 129 has a dimension X (as illustrated in FIGS. 25 and 26). The projected portion 129 may also include angled walls 145 to correspond with the angled wall 224 of the slot 220 of the battery pack receptacle 210. As illustrated in FIG. 37, when the second battery pack 100 is inserted into the battery pack receptacle 210 and mated with the power tool 200, the projected portion 129 of the bottom wall 126 of the second battery pack 100 is received in the slot 220. As such, the slot 220 assists in holding the second battery pack 100 in place relative to the battery pack receptacle housing 212.

Referring to FIGS. 38 through 42, in another exemplary embodiment, the first and second battery packs 10/100 may include features to address the increased weight resulting from larger and more powerful battery pack systems. To ensure that large battery packs with weights up to and over ten pounds and their mechanical interfaces 18/118— particularly the rails 20/120— are not susceptible to cracking, the strength of rail system is significantly increased by adding a second sloped wall 46/146 at the mating face of the mechanical interface 18/118, In order to assist in removing the battery pack 10/100 from the power tool 200, a spring 226 may be included in the power tool 200 to force the battery pack 10/100 out of the battery pack receptacle 210 when a latch 228 on the power tool 200 is released.

However, with the presence of the sloped wall 46/146, in order for the springs 226 to properly operate, the springs 226 require a flat engagement or contact surface 47/147 as well as a spring receptacle 48/148 to trap the spring 226 so it stays in line with the flat engagement surface 47/147. The spring receptacle 48/148 is preferably of a size and shape to be concentric with the spring 226, Providing small circular flat surfaces on the sloped front face keeps most of the sloped front wall 46/146 to ensure strength while the flat portion 47/147 of the spring receptacle 48/148 provides a contact surface for the springs 226. The material remaining around the spring receptacle 48148 serves as a guide and trap for the spring 226.

Figure 38:
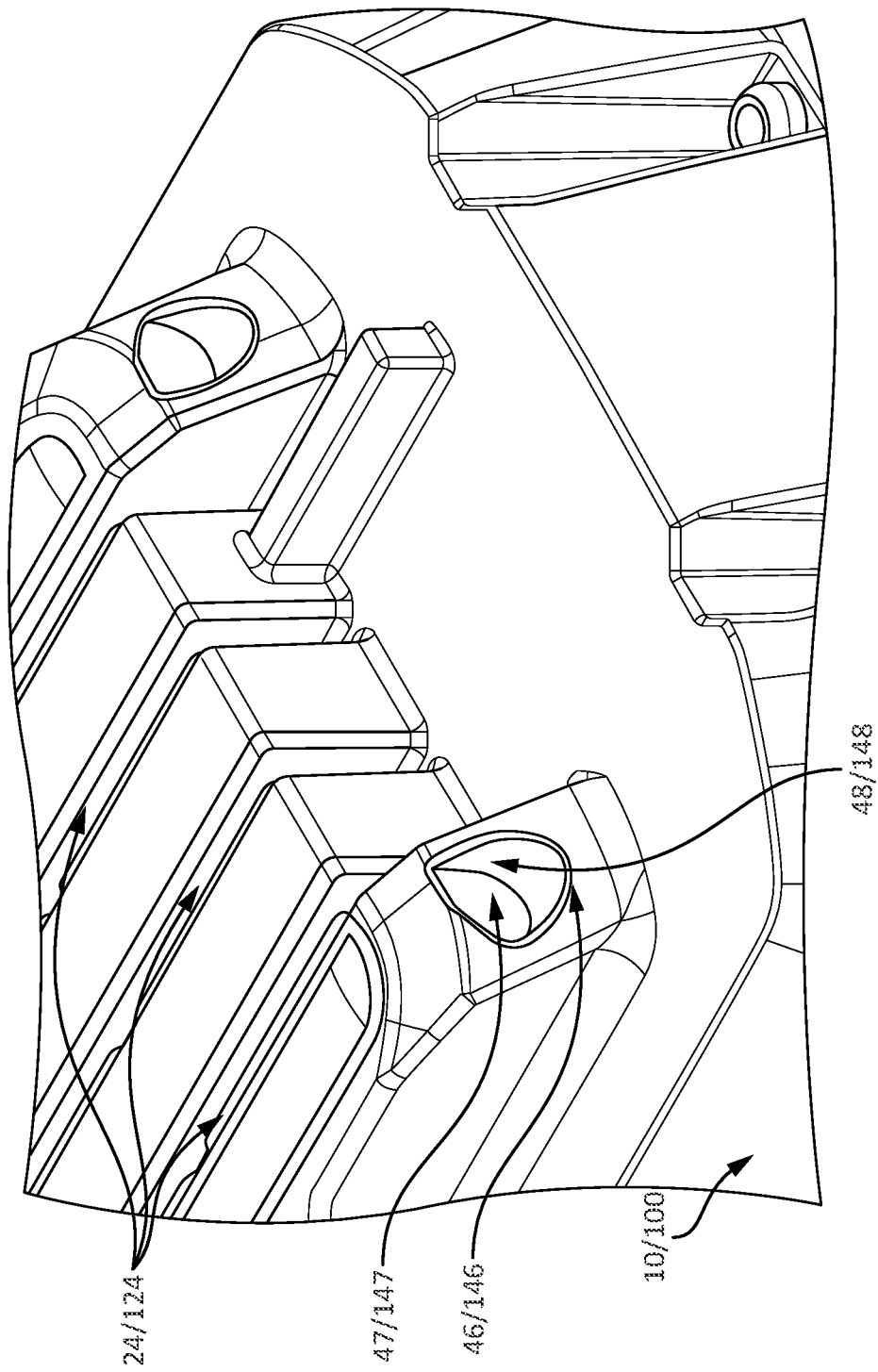
FIG. 38 is a view of the battery pack of FIG. 2 at detail A.

As illustrated in FIG. 38, in one embod8iment the battery pack 10/100 includes a pair of sloped walls 46/146 at the mating end. Each sloped wall 46/146 may include a spring receptacle 48/148 for receiving a spring 226 of the power tool 200. The spring receptacle 48/148 may have a semi-cylindrical shape that is dimensioned to be concentric with the power tool spring 226. The spring receptacle 48/148 may include a spring engagement surface 47/147 perpendicular to the mating direction. The spring engagement surface 47/147 will engage with the spring 226 when the battery pack 10/100 mates with the power tool 200.

Figure 39:
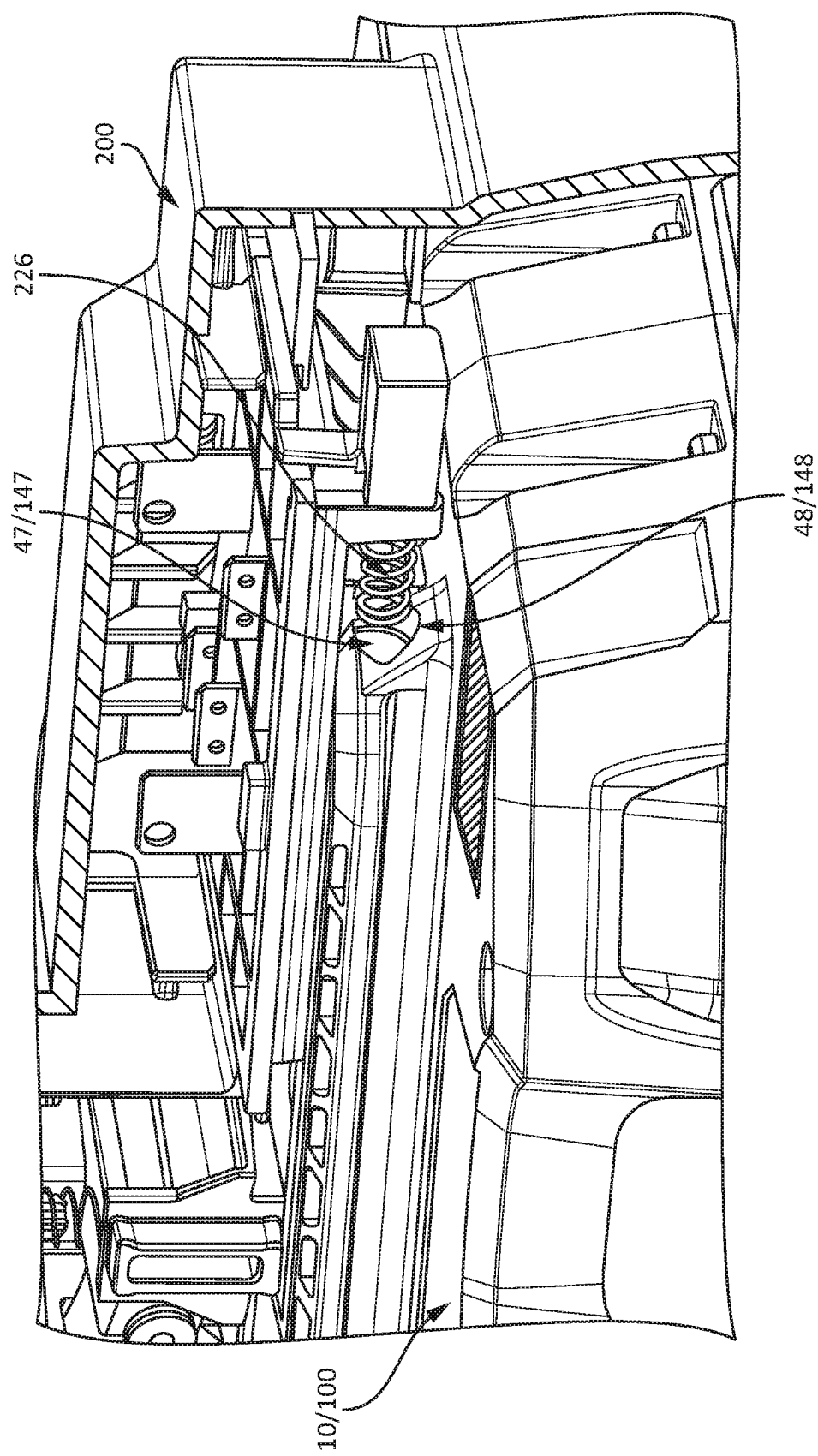
FIG. 39 is a partial isometric view of the battery pack of FIG. 2 and a partial section view of the receptacle of FIG. 34 along section line B-B of FIG. 36 just prior to coupling.

As illustrated in FIG. 39, the power tool 200 may include a pair of springs 226 (only one is shown in FIG. 39). Prior to engaging with the battery pack 10/100 the spring 226 is in its uncompressed state. As the battery pack 10/100 is inserted to the power tool 200 and the power tool rails 204 are received in the battery pack grooves 22/122, the spring 226 will be aligned with the spring receptacle 48/148.

Figure 40:
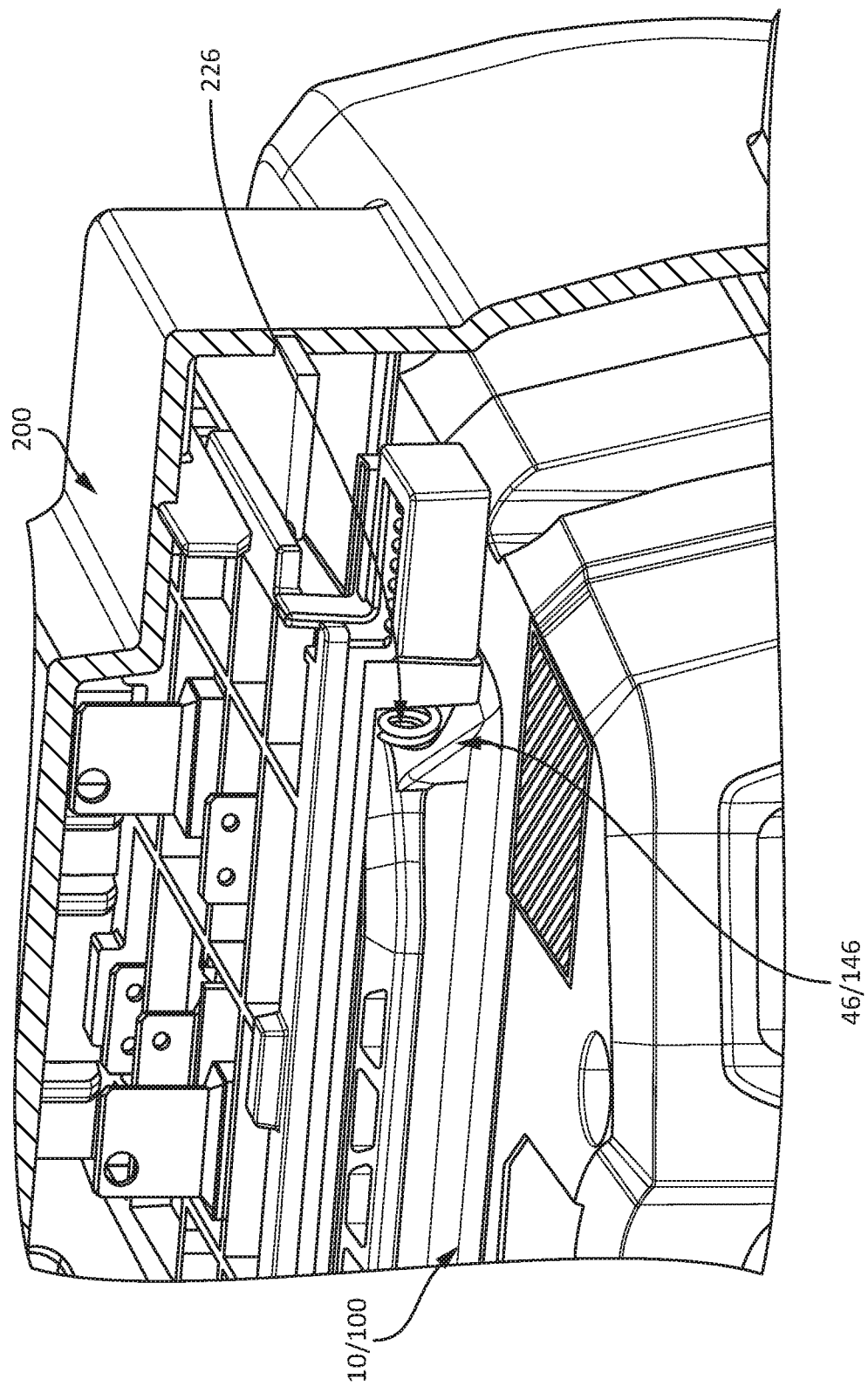
FIG. 40 is a partial isometric view of the battery pack of FIG. 2 and a partial section view of the receptacle of FIG. 34 along section line B-B of FIG. 36 fully coupled.
Figure 41:
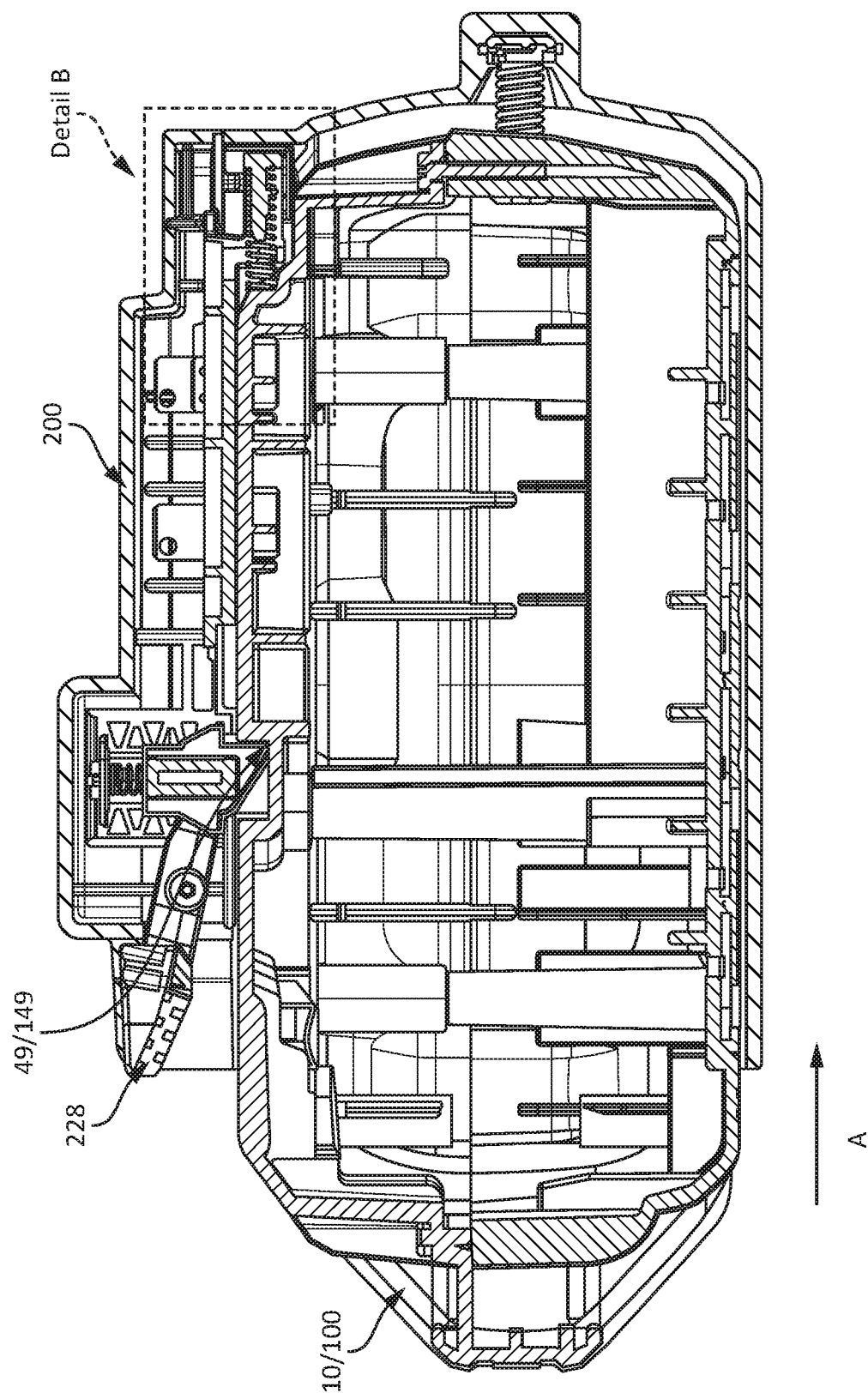
FIG. 41 is a section view of the battery pack of FIG. 2 in the battery receptacle of FIG. 34 along section line B-B of FIG. 36.
Figure 42:
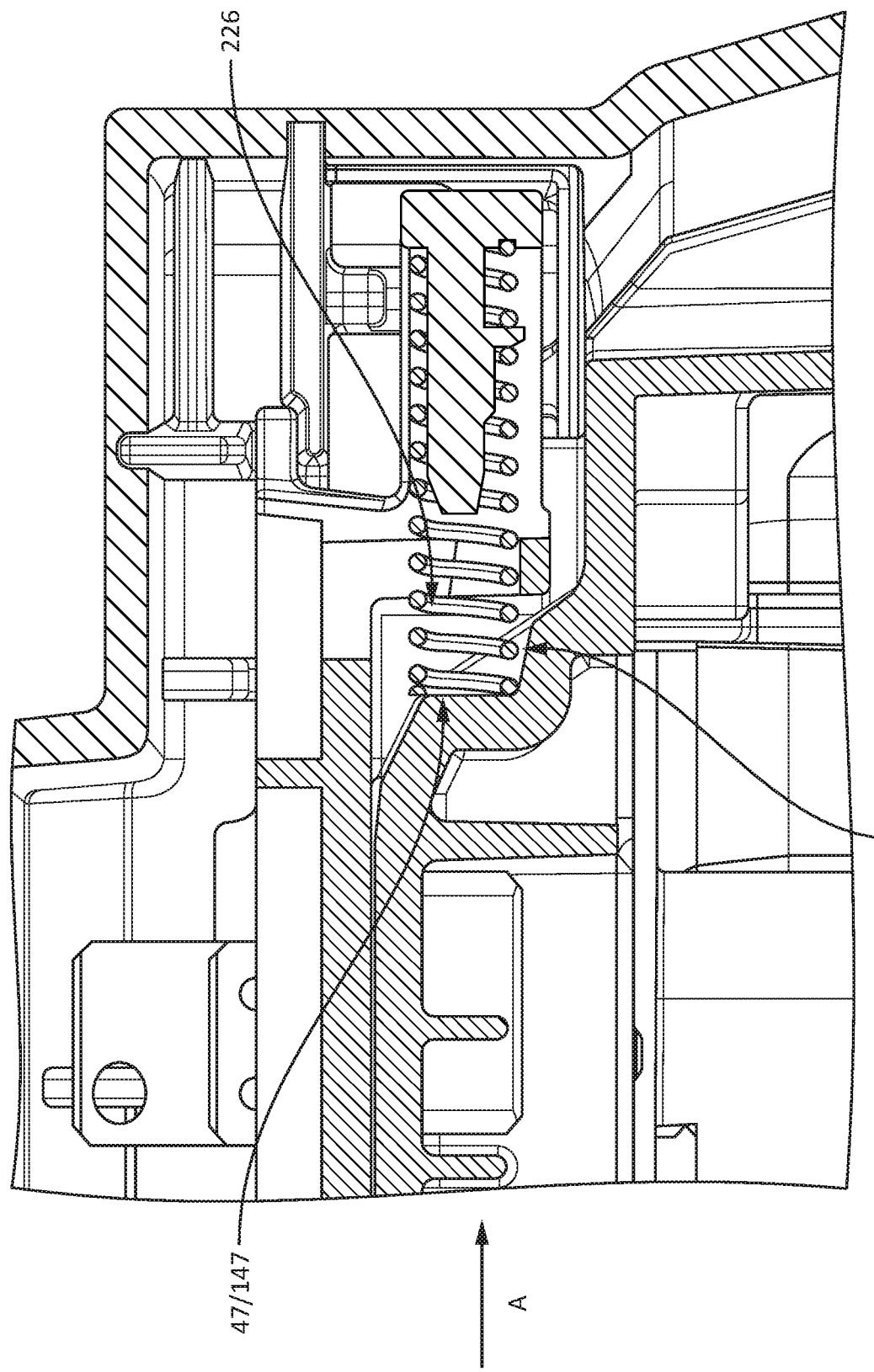
FIG. 42 is a view of the battery pack and receptacle of FIG. 41 at detail B.

As illustrated in FIGS. 40, 41, and 42, when the battery pack 10/100 is fully mated with the power tool 200 the spring 226 will be fully compressed. The latch 228 on the power tool 200 will be received in a catch 49/149 of the battery pack 10/100 to hold the battery pack 10/100 fully engaged/mated with the power tool 200. When the latch 228 is operated by a user to release the battery pack 10/100, the springs 226 will force the battery pack 10/100 (at least partially) out of the battery pack receptacle 210.

Numerous modifications may be made to the exemplary implementations described above. These and other implementations are within the scope of this application.

The invention claimed is:

1. A power tool system, comprising:
a power tool having a receptacle for receiving a battery pack, the receptacle including a slot having a first slot dimension;
a first battery pack having a battery pack housing having a first battery pack housing width dimension and a portion of a bottom wall of the first battery pack housing having a first battery pack bottom wall dimension parallel to the first battery pack housing width dimension equal to the first slot dimension, the portion of the bottom wall of the first battery pack is received in the slot when the first battery pack is inserted into the battery pack receptacle; and
a second battery pack having a battery pack housing having a second battery pack housing width dimension that is greater than the first battery pack housing width dimension and a portion of a bottom wall of the second battery pack housing having a second battery pack bottom wall dimension parallel to the second battery pack housing width dimension equal to the first slot dimension, the portion of the bottom wall of the second battery pack is received in the slot when the second battery pack is inserted into the battery pack receptacle.

2. The power tool system, as recited in claim 1, wherein the second battery pack housing width dimension is at least 1.5 times the first battery pack housing width dimension.

3. The power tool system, as recited in claim 1, wherein the slot includes an angled wall.

4. The power tool system, as recited in claim 3, wherein the portion of the bottom wall of the first battery pack housing includes an angled wall matching the slot angled wall.

5. The power tool system, as recited in claim 3, wherein the portion of the bottom wall of the second battery pack housing includes an angled wall matching the slot angled wall.

6. The power tool system, as recited in claim 1, wherein the portion of the bottom wall of the second battery pack housing is projected from the bottom wall of the second battery pack.

* * * * *